US012739627B2

(12) United States Patent
Castellanos Zamora et al.

(10) Patent No.: US 12,739,627 B2
(45) Date of Patent: Sep. 15, 2026

(54) AUTHENTICATION IN A COMMUNICATION NETWORK

(71) Applicant: Telefonaktiebolaget LM Ericsson (publ), Stockholm (SE)

(72) Inventors: David Castellanos Zamora, Madrid (ES); Afshin Abtin, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 565 days.

(21) Appl. No.: 18/006,951

(22) PCT Filed: Aug. 13, 2021

(86) PCT No.: PCT/SE2021/050790

§ 371 (c)(1),
(2) Date: Jan. 26, 2023

(87) PCT Pub. No.: WO2022/035369

PCT Pub. Date: Feb. 17, 2022

(65) Prior Publication Data

US 2023/0269582 A1 Aug. 24, 2023

Related U.S. Application Data

(60) Provisional application No. 63/065,239, filed on Aug. 13, 2020.

(51) Int. Cl.

| | |
|---|---|
| ***H04W 12/06*** | (2021.01) |
| ***H04L 65/1016*** | (2022.01) |
| ***H04W 12/0433*** | (2021.01) |

(52) U.S. Cl.

CPC ......... *H04W 12/06* (2013.01); *H04L 65/1016* (2013.01); *H04W 12/0433* (2021.01)

(58) Field of Classification Search

CPC . H04W 12/06; H04W 12/0433; H04W 60/04; H04W 60/00; H04W 48/18;

(Continued)

(56) References Cited

U.S. PATENT DOCUMENTS

2003/0200433 A1* 10/2003 Stirbu .................. H04L 9/0844 713/169
2008/0155658 A1* 6/2008 Leinonen ............. H04L 63/205 726/4

(Continued)

FOREIGN PATENT DOCUMENTS

| | | | |
|---|---|---|---|
| CN | 111165001 | A | 5/2020 |
| EP | 1798910 | A1 | 6/2007 |
| WO | 2019222604 | A | 11/2019 |

OTHER PUBLICATIONS

International Search Report and Written Opinion dated Jan. 11, 2022 for International Application No. PCT/SE2021/050790 filed Aug. 13, 2021, consisting of 14 pages.

(Continued)

*Primary Examiner* — Nimesh Patel
(74) *Attorney, Agent, or Firm* — Weisberg I.P. Law, P.A.

(57) ABSTRACT

A method performed by a first IP multimedia system, IMS, node, for handling authentication of a user equipment, UE, in a communication network. The method includes receiving a request from a second IMS node to retrieve an authentication vector. The request includes a private identifier generated from a subscription permanent identifier. The method further includes sending a request to retrieve an indication, where the request includes a subscription permanent identifier, receiving the indication, and generating the authentication vector using the received indication. In addition, the method includes sending the generated authentication vector to the second IMS node for authenticating the UE.

16 Claims, 25 Drawing Sheets

(58) Field of Classification Search

CPC . H04W 84/042; H04W 12/041; H04W 92/18; H04W 12/08; H04W 74/0833; H04W 12/02; H04W 12/72; H04W 72/51; H04W 4/50; H04W 8/04; H04W 12/42; H04W 8/08; H04W 12/04; H04W 36/00698; H04L 65/1016; H04L 9/0861; H04L 9/3271; H04L 65/1073; H04L 65/1104; H04L 2209/76; H04L 2209/80; H04L 67/51; H04L 5/0023; H04L 1/1812; H04L 1/1864; H04L 41/0894; H04L 5/0055; H04L 1/1896; H04L 41/16; H04L 61/4588; H04L 9/40; H04L 12/1407; H04L 2101/395; H04L 2101/38; H04L 41/5009; H04L 63/0407; H04L 65/1045; H04L 41/14; H04L 63/107; H04L 61/5007; H04L 63/108; H04L 63/0823; H04L 65/1066; H04L 65/1063; H04L 63/30; Y02D 30/70; G06N 20/00; G06N 20/20; G06N 3/08

See application file for complete search history.

(56) References Cited

U.S. PATENT DOCUMENTS

2008/0244266 A1* 10/2008 Cai ....................... H04L 63/083 713/170
2016/0359824 A1* 12/2016 Faynberg ............ H04L 63/0853
2017/0006571 A1* 1/2017 Allen .................... H04W 76/40
2018/0069813 A1* 3/2018 Tevonian ............ H04L 65/1094
2020/0229118 A1* 7/2020 Martinez-Minguito .................... H04L 63/0442

OTHER PUBLICATIONS

3GPP TR 23.700-07 V0.3.0, 3rd Generation Partnership Project; Technical Specification Group Services and System Aspects; Study on enhanced support of non-public networks (Release 17); Jan. 2020, consisting of 42 pages.

3GPP TS 23.501 V16.4.0. 3rd Generation Partnership Project; Technical Specification Group Services and System Aspects; System architecture for the 5G System (5GS); Stage 2 (Release 16); Mar. 2020, consisting of 430 pages.

3GPP TS 33.203 V15.1.0; 3rd Generation Partnership Project; Technical Specification Group Services and System Aspects; 3G security; Access security for IP-based services (Release 15); Mar. 2018, consisting of 145 pages.

3GPP TS 33.535 V0.4.0; 3rd Generation Partnership Project; Technical Specification Group Services and System Aspects; Authentication and key management for applications; based on 3GPP credential in 5G (AKMA) (Release 16); Apr. 2020, consisting of 15 pages.

3GPP TS 33.501 V16.2.0; 3rd Generation Partnership Project; Technical Specification Group Services and System Aspects; Security architecture and procedures for 5G system (Release 16); Mar. 2020, consisting of 227 pages.

3GPP TSG-SA Wg2 Meeting #139E S2-2003585; Title: KI #3. New Sol : Providing IMS voice and emergency services for SNPN subscribers reusing access level identifiers and credentials; Source; Ericsson; Agenda Item: 8.2; Work Item/Release: FS.eNPN/Rel-17; Document for: Approval; Date and Location: Elbonia, Jun. 1-12, 2020, consisting of 7 pages.

3GPP TSG-SA3 Meeting #99e S3-201050 Revision of S3-20xxxx; Title: pCR to TS 33.535: Store AKMA key material In AAnF; Source: Ericsson; Agenda Item: 4.10; Document for: Approval; Date and Location: e-meeting, May 11-15, 2020, consisting of 4 pages.

Chinese Office Action and English Summary dated Jan. 29, 2026 for Application No. 202180056023.2, consisting of 12 pages.

3GPP TSG-SA WG3 Meeting #101-e S3-203156; Title: New Solution to KI#3: Authentication to IMS Core using credentials generated from the KAUSF; Source: Ericsson; Document for: Approval; Agenda Item: 5.12; Location and Date: e-meeting, Nov. 9-20, 2020, consisting of 5 pages.

3GPP TSG-SA WG3 Meeting #100bis-e S3-202555; Title: New Solution to KI#3: Authentication to IMS Core using credentials generated from the KAUSF; Source: Ericsson; Document for: Approval; Agenda Item: 2.12; Location and Date: e-meeting, Oct. 12-16, 2020, consisting of 5 pages.

Huang, Hai "Research on Password-Free Login Scheme for 5G Terminal Apps Accessing the Internet via WiFi" Information Technology Series, China Academic Journal Electronic Publishing House, Sep. 25, 2019, consisting of 12 pages.

* cited by examiner 1509
1508

11. FIRST CORE NODE

1602. RECEIVING UNIT

1603. SELECTING UNIT

1604. SENDING UNIT

1605. PROVIDING UNIT

1601. PROCESSING CIRCUITRY

1607. MEMORY

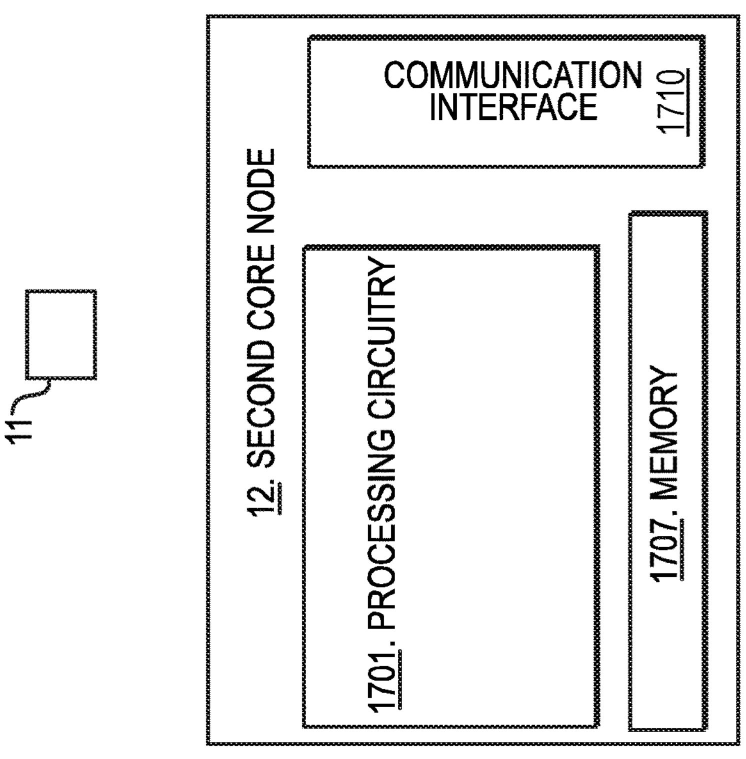
12. SECOND CORE NODE
1702. RECEIVING UNIT
1703. GENERATING UNIT
1704. SENDING UNIT
1705. STORING UNIT
1701. PROCESSING CIRCUITRY
1707. MEMORY
FIG. 18
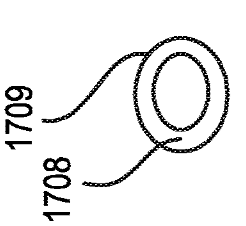

13. THIRD CORE NODE
1802. RECEIVING UNIT
1803. GENERATING UNIT
1804. SENDING UNIT
1801. PROCESSING CIRCUITRY
1807. MEMORY
1809
1808

10. UE
1902. REGISTERING UNIT
1903. STORING UNIT
1904. DERIVING UNIT
1905. GENERATING UNIT
1906. SENDING UNIT
1901. PROCESSING CIRCUITRY
1907. MEMORY
1909
1908

AUTHENTICATION IN A COMMUNICATION NETWORK

CROSS-REFERENCE TO RELATED APPLICATIONS

This application is a Submission Under 35 U.S.C. § 371 for U.S. National Stage Patent Application of International Application No.: PCT/SE2021/050790, filed Aug. 13, 2021 entitled "AUTHENTICATION IN A COMMUNICATION NETWORK," which claims priority to U. S. Provisional Application No.: 63/065,239, filed Aug. 13, 2020, entitled "FIRST IMS NODE, FIRST CORE NODE, SECOND CORE NODE, THIRD CORE NODE, USER EQUIPMENT AND METHODS PERFORMED THEREIN," the entireties of both of which are incorporated herein by reference.

TECHNICAL FIELD

Embodiments herein relate to a first IMS node, a first core node, a second core node, a third core node a User Equipment (UE) and methods performed therein for communication. Furthermore, a computer program and a computer readable storage medium are also provided herein. In particular, embodiments herein relate to handling authentication of a UE within a communication network.

BACKGROUND

In a typical communication network, wireless devices, also known as wireless communication devices, mobile stations, stations (STA) and/or UE, communicate via a Radio Access Network (RAN) to one or more core networks (CN). The RAN covers a geographical area which is divided into service areas or cell areas, with each service area or cell area being served by a radio network node such as a radio access node e.g., a Wi-Fi point or a radio base station (RBS), which in some networks may also be denoted, for example, a NodeB, an eNodeB", or a gNodeB. A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipment. In a forum known as the Third Generation Partnership Project (3GPP), telecommunications suppliers propose and agree upon standards for third generation networks, and investigate enhanced data rate and radio capacity. In some RANs, e.g., as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS) have been completed within the 3GPP and this work continues in the coming 3GPP releases. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access technology wherein the radio network nodes are directly connected to the EPC core network rather than to RNCs. In general, in E-UTRAN/LTE the functions of an RNC are distributed between the radio network nodes, e.g., eNodeBs in LTE, and the core network. As such, the RAN of an EPS has an essentially "flat" architecture comprising radio network nodes which can be connected directly to one or more core networks, i.e., they do not need to be connected to the core via RNCs.

With the emerging 5G technologies such as New Radio (NR), the use of a large number of transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify received signals coming from a selected direction or directions, while suppressing received unwanted signals coming from other directions.

The primary authentication process in 5G Core (5GC) is discussed in 3GPP, e.g., Technical Specification (TS) 33.501. An overview of the primary authentication process is depicted in FIG. 1 and shows the following steps.

Step S1. The UE initiates a Non-Access Stratum (NAS) signaling procedure with the 5GC. The NAS signaling includes the UE id in the form of a Subscription Concealed Identifier (SUCI), in case of initial registration, or a Global Unique Temporal user Identity (GUTI) in case of subsequent requests.

Step S2. The AMF initiates a primary authentication procedure, which includes the Access and Mobility Management Function (AMF) contacting an Authentication Server Function (AUSF) using a Nausf_UEAUthenticate_Request.

Step S3. The AUSF contacts a Unified Data Management (UDM) to request authentication information for the UE.

Steps S4 and S5. The UDM de-conceals the SUCI if needed and selects an authentication method applicable to the UE based on subscription information, e.g., 5G-Authentication and Key Agreement (AKA), Extensible Authentication Protocol (EAP)-AKA or other EAP procedures, and provides related parameters accordingly to the AUSF if needed. For example, for AKA, the UDM generates an AKA Authentication Vector.

Steps S6 and S7. The AUSF executes the primary authentication procedure with the UE, e.g., AKA based as shown in FIG. 1. As a result, the UE and the AMF agree on a security key used to derive further security keys for NAS and Access Stratum (AS) protection.

Additionally, the primary authentication procedure results in a security key, e.g., Kausf, shared between the UE and the AUSF. The Kausf is used in subsequent procedures invoked by UDM. The storage of this key in the UE and AUSF is conditional to the need for such key for the related procedures supported at the Home Public Land Mobile Network (HPLMN) that requires it. Currently, the Kausf is used in the context of Steering of Roaming and UE Parameters Update procedures.

Steps S8 and S9. The AUSF informs the UDM about the result of the primary authentication procedure. This may be used by the UDM to improve Home Network control of authentication result to e.g., bind the authentication status of the UE for the authorization of subsequent UE procedures with UDM.

3GPP TS 23.501 Release 16 defines architecture and solutions to enable support for non-public networks in 5GC. A Non-Public Network (NPN) is a 5G System (5GS) deployed for non-public use. An NPN may be deployed as a Stand-alone Non-Public Network (SNPN), i.e., operated by an NPN operator and not relying on network functions provided by a Public Land Mobile Network (PLMN).

In the context of 3GPP TR 23.700-07 Release 17, 3GPP is studying a possibility to enable services and capabilities offered by the PLMN to the SNPN. In particular, Internet Protocol (IP) Multimedia Subsystem (IMS) based voice/video/messaging capabilities are in focus.

One possibility, illustrated in FIG. 2, proposes reuse of UE credentials used for UE authentication in the 5GC of the SNPN for IMS level authentication at the PLMN. This is, in case the SNPN UE is provided with a UMTS Subscriber Identity Module (USIM) including AKA credentials, the Home Subscriber Server (HSS)-IMS can request AKA AVs to the UDM/Authentication credential Repository and Processing Function (ARPF) over the NU1 reference point. In this case, the UDM/ARPF behaves as an Authentication Center (AuC) and provides IMS AKA AVs to the HSS-IMS.

However, in SNPN deployments, it is expected that the UEs are not going to be using authentication mechanisms based on using an IMSI and AKA mechanism, primarily because UEs may not even be able to host a Universal Integrated Circuit Card (UICC). Identity and authentication management is likely to be based on alternative identifiers and credentials, e.g., SUPIs in Network Access Identifier (NAI) format and certificate-based authentication using EAP—Transport Layer Security (TLS).

Therefore, support for the IMS security solution defined in 3GPP TS 33.203, i.e., IMS-AKA, in UEs used in SNPN may not be in place either. As such, alternative authentication mechanisms to enable IMS services to SNPN UEs should be used.

Another authentication mechanism in IMS is Session Initiation Protocol (SIP) Digest authentication based on HTTP digest authentication, using a username and a password as credentials. SIP Digest authentication is also defined in 3GPP TS 33.203. A procedure for SIP Digest authentication is depicted in FIG. 3.

3GPP Rel-16 is introducing a new feature, called Authentication and Key Management for Applications (AKMA) to support authentication and key management aspects for applications and 3GPP services based on 3GPP credentials in 5G, including IoT use cases described in 3GPP TS 33.535.

AKA credentials may be leveraged to bootstrap security between the UE and an Application Function (AF), which allows the UE to securely exchange data with an application server as shown by a sequence of steps S1A-S7A in FIG. 4. AKMA reuses the result of a 5G primary authentication procedure executed during the UE Registration to authenticate the UE. This is called implicit bootstrapping. In this procedure, the AUSF generates the AKMA key material, e.g., Kakma as shown in step S1A in FIG. 4. The Kakma is generated from the Kausf. An AKMA Key Identifier (A-KID) is also generated at this time. The UE may also generate Kakma and A-KID at this time, but the UE will typically generate Kakma and A-KID when needed to initiate the AKMA procedure, shown in step S3A. The AKMA Anchor Function (AAnF) is a new logical entity introduced by AKMA, i.e., an anchor function in the HPLMN for key material generation that are used between the UE and the AF. After the primary authentication, the AUSF pushes the generated AKMA Key material to the AAnF at step S2A, which maintains UE AKMA contexts to be used for subsequent AKMA procedures. It is noted that the AUSF pushing the AKMA material to the AAnF as shown in step S2A has been recently agreed in 3GPP in Ericsson Tdoc S3-201050 and, therefore, not yet included in 3GPP TS 33.535. Then, the UE initiates an application request with the AF, step S3A, which includes the A-KID. Prior to initiating the application request, the UE also generates an AF specific key from Kakma, e.g., Kaf. The AF then contacts the AAnF to fetch a Kaf, step S4A. The AF uses the A-KID to refer to the UE. In the case that the AF belongs to an external network, the AF contacts the AAnF via a Network Exposure Function (NEF) (not depicted). The AAnF derives the corresponding Kaf for the UE the A-KID refers to and provides it to the AF, steps S5A and S6A-6. Finally, the UE and the AF can engage in secure application communication in step S7A based on the common Kaf key generated.

A problem with the existing solutions is that it is not possible to reuse the SNPN credentials for IMS-AKA for SNPN UEs that do not have an USIM. Another problem is that IMS authentication using SIP Digest requires that SNPN UEs be configured with PLMN credentials, i.e., username and passwords for SIP Digest authentication at the IMS domain of the PLMN. Thus, an authentication solution to enable IMS services to SNPN UEs which avoids the configuration of SNPN UEs would be desired.

SUMMARY

An object of embodiments herein is to provide a mechanism for improving performance of the communication network in an efficient manner.

According to an aspect of embodiments herein the object may be achieved by a method performed by a first IMS node, e.g., HSS, for handling authentication of a UE in a communication network. The first IMS node receives a request from a second IMS node, e.g., S-CSCF, to retrieve an authentication vector, wherein the request comprises a private identifier generated from a subscription permanent identifier. The first IMS node further sends a request to retrieve an indication. The request comprises a subscription permanent identifier generated from a private identifier. The first IMS node then further receives the indication. The first IMS node further generates the authentication vector using the received indication. The IMS node also sends the generated authentication vector to the second IMS node for authenticating the UE.

According to another aspect of embodiments herein, the object may be achieved by a method performed by a first core node, e.g., UDM, for handling authentication of a UE in a communication network. The first core node receives a request from a first IMS node to retrieve an indication, wherein the request comprises a subscription permanent identifier generated from the private identifier. The first core node further selects a second core node that stores a first security key result of a latest authentication of the UE in an access network. The first core node then sends an indication request to the selected second core node. The first core node further receives the indication from the second core node. The indication is based on a first security key that is stored in the second core node. The first core node then provides the received indication to the first IMS node.

According to another aspect of embodiments herein, the object may be achieved by a method performed by a second core node, e.g., AUSF, for handling authentication of a UE in a communication network. The second core node stores a first security key generated from a primary authentication of the UE in an access network. The second core node further receives an indication request from a first core node. The second core node further generates an indication based on a first security key result of the latest authentication of the UE in an access network. The second core node then sends the generated indication to the first core node.

According to another aspect of embodiments herein, the object may be achieved by a method performed by a third core node, e.g., AAnF, for handling authentication of a UE in a communication network. The third core node receives an indication request from a first IMS node. The third core node further generates the indication based on an AKMA procedure. The third core node then sends the generated indication to the first IMS node.

According to another aspect of embodiments herein the object may be achieved by a method performed by a UE for handling authentication of the UE in a communication network. The UE registers to the access network by performing the primary authentication procedure. The UE further stores the first security key generated from the primary authentication of the UE in the access network. The UE further derives the second security key from the first security key based on an AKMA procedure. The UE then generates a password based on a stored first security key or a second security key which will be used for authenticating the UE to an IMS. The UE further sends a message, to a second IMS node for registering the UE to the IMS, based on the password generated during a primary authentication to an access network. The message comprises a private identifier and a public identifier.

According to another aspect of embodiments herein, the object is achieved by providing a first IMS node, e.g., HSS, for handling authentication of a UE in a communication network. The first IMS node is configured to receive a request from a second IMS node to retrieve an authentication vector, wherein the request is adapted to comprise a private identifier generated from a subscription permanent identifier. The first IMS node is further configured to send a request to retrieve an indication, wherein the request is adapted to comprise a subscription permanent identifier generated from a private identifier. The first IMS node is further configured to receive the indication and to generate the authentication vector using the received indication. The first IMS node is further configured to send the generated authentication vector to the second IMS node for authenticating the UE.

According to another aspect of embodiments herein, the object is achieved by providing a first core node, e.g., UDM, for handling authentication of a UE in a communication network. The first core node is configured to receive a request from a first IMS node to retrieve an indication, wherein the request is adapted to comprise a subscription permanent identifier generated from the private identifier. The first core node is further configured to select a second core node that stores a first security key result of a latest authentication of the UE in an access network. In addition, the first core node is configured to send an indication request to the selected second core node and to receive the indication from the second core node, wherein the indication is adapted to be based on a first security key, stored in the second core node. The first core node is further configured to provide the received indication to the first IMS node.

According to another aspect of embodiments herein, the object is achieved by providing a second core node, e.g., AUSF, for handling authentication of a UE in a communication network. The second core node is configured to store a first security key generated from a primary authentication of the UE in an access network. The second core node is further configured to receive an indication request from a first core node. The second core node is further configured to generate an indication based on a first security key result of the latest authentication of the UE in an access network. The second core node is further configured to send the generated indication to the first core node.

According to another aspect of embodiments herein, the object is achieved by providing a third core node, e.g., AAnF, for handling authentication of a UE in a communication network. The third core node is configured to receive an indication request from a first IMS node. The third core node is further configured to generate the indication based on an AKMA procedure. The third core node is further configured to send the generated indication to the first IMS node.

According to another aspect of embodiments herein, the object is achieved by providing a UE for handling authentication of the UE in a communication network. The UE is configured to register to an access network by performing the primary authentication procedure. The UE is further configured to store the first security key generated from the primary authentication of the UE in the access network. In addition, the UE is configured to derive the second security key from the first security key based on an AKMA procedure. The UE is further configured to generate a password based on a stored first security key or a second security key which will be used for authenticating the UE to an IMS. Further, the UE is configured to send a message to a second IMS node for registering the UE to the IMS, based on the password generated during a primary authentication to an access network. The message sent to the second IMS node comprises a private identifier and a public identifier.

It is furthermore provided herein a computer program comprising instructions, which, when executed on at least one processor, cause the at least one processor to carry out any of the methods above, as performed by the first IMS node, first core node, second core node, third core node and UE, respectively. It is additionally provided herein a computer-readable storage medium, having stored thereon a computer program comprising instructions which, when executed on at least one processor, cause the at least one processor to carry out the method above, as performed by the first IMS node, first core node, second core node, third core node and UE, respectively.

The password may be generated based on the first security key and/or based on the AKMA procedure when authenticating the UE in the IMS domain. Credentials generated during the primary authentication of the UE may be reused, and configuration of UEs is avoided, which provides an accurate authentication mechanism in 5GC for the UEs, e.g., UEs that cannot host a Universal Integrated Circuit Card (UICC) such as a Subscriber Identity Module (SIM) card, or UEs that cannot use IMSI-AKA based security mechanisms. In other words, the provided authentication mechanism enables a simple, yet secured authentication mechanism to UEs to access the IMS domain, which in turn improves the performance of the communication network, e.g., typical communication networks, in an efficient manner.

According to one aspect, a method performed by a first IP multimedia system, IMS, node for handling authentication of a user equipment, UE, (10) in a communication network is described. The method includes receiving a request from a second IMS node to retrieve an authentication vector. The request to retrieve the authentication includes a private identifier generated from a subscription permanent identifier. The method also includes sending a request to retrieve an indication, which includes the subscription permanent identifier, receiving the indication, and generating the authentication vector using the received indication. Further, the method includes sending the generated authentication vector to the second IMS node for authenticating the UE.

In some embodiments, the request to retrieve the indication is sent to a first core node that is a Unified Data Management, UDM, node.

In some other embodiments, the request to retrieve the indication is sent to a third core node that is an Authentication and Key Management for Applications, AKMA, Anchor Function, AAnF, node.

In one embodiment, the indication is one of a password and a second security key, where the second security key is a Kaf security key.

In another embodiment, the authentication vector is a Session Internet Protocol Digest Authentication Vector, SD-AV.

In some embodiments, the private identifier is an Internet Protocol Multimedia Subsystem, IMS, Private User Identity, IMPI.

In some other embodiments, the first IMS node is Home Subscriber Server, HSS, and the second IMS node is a Serving Call Session Control Function, S-CSCF, node.

According to another aspect, a method performed by a first core node for handling authentication of a user equipment, UE, in a communication network is described. The method includes receiving a request from a first IP multimedia system, IMS, node to retrieve an indication, where the request includes a subscription permanent identifier generated from the private identifier. The method also includes selecting a second core node that stores a first security key result of a latest authentication of the UE in an access network, sending an indication request to the selected second core node, and receiving the indication from the second core node, the indication being based on a first security key stored in the second core node. Further, the method also includes providing the received indication to the first IMS node.

In some embodiments, the indication is a password.

In some other embodiments, the password is a Session Internet Protocol Password, SIP, Digest password.

In one embodiment, the first security key is a Kausf security key.

In another embodiment, the first core node is a Unified Data Management, UDM, node, the second core node is an Authentication Server Function, AUSF, node, and the first IMS node is a Home Subscriber Server, HSS.

According to one aspect, a method performed by a second core node for handling authentication of a user equipment, UE, in a communication network is described. The method includes receiving an indication request from a first core node, generating an indication based on a first security key result of the latest authentication of the UE in an access network, and sending the generated indication to the first core node.

In some embodiments, the method further includes storing a first security key generated from a primary authentication of the UE in an access network.

In some other embodiments, the first security key is a Kausf security key.

In one embodiment, the indication is a password.

In another embodiment, the password is a Session Internet Protocol Password, SIP, Digest password.

In some embodiments, the first core node is a Unified Data Management, UDM, node, and the second core node is an Authentication Server Function, AUSF, node.

According to another aspect, a method performed by a third core node for handling authentication of a user equipment, UE, in a communication network is described. The method includes receiving an indication request from a first IMS node, generating the indication based on an authentication procedure, and sending the generated indication to the first IMS node.

In some embodiments, the indication is a second security key.

In some other embodiments, the second security key is a Kaf security key.

In one embodiment, the authentication procedure is an Authentication and Key Agreement for Applications, AKMA, procedure.

In another embodiment, the third core node is an Authentication and Key Management for Applications, AKMA, Anchor Function, AAnF, node, and the first IMS node is a Home Subscriber Server, HSS.

According to one aspect, a method performed by a User Equipment, UE, for handling authentication of the UE in a communication network is described. The method includes generating a password based on any one of a stored first security key and a derived second security key. The password is used for authenticating the UE to a network node. The method further includes sending a message to a second IMS node for registering the UE to the network node based on the generated password. The message includes a private identifier and a public identifier.

In some embodiments, the method further includes registering to an access network by performing a primary authentication procedure, where the access network is part of the communication network, and storing the first security key generated from the primary authentication of the UE in the access network.

In some other embodiments, the first security key is a Kausf security key.

In one embodiment, the method further includes deriving the second security key from the first security key based on an authentication procedure.

In another embodiment, the second security key is a Kaf security key.

In some embodiments, the authentication procedure is an Authentication and Key Agreement for Applications, AKMA, procedure.

In some other embodiments, the network node is an IP multimedia system, IMS, node, and the second IMS node is a Serving Call Session Control Function, S-CSCF.

In one embodiment, the password is a Session Internet Protocol Password, SIP, Digest password.

In another embodiment, the private identifier is an Internet Protocol Multimedia Subsystem, IMS, Private User Identity, IMPI, and the public identifier is an IMS Public User Identity, IMPU. The IMPI and the IMPU are generated based on a Subscription Permanent Identifier, SUPI.

According to another aspect, a first IP multimedia system, IMS, node for handling authentication of a user equipment, UE, in a communication network is described. The first IMS node is configured to receive a request from a second IMS node to retrieve an authentication vector, where the request to retrieve the authentication includes a private identifier generated from a subscription permanent identifier, and send a request to retrieve an indication. The request to retrieve the indication includes the subscription permanent identifier. The first IMS node is further configured to receive the indication, generate the authentication vector using the received indication, and send the generated authentication vector to the second IMS node for authenticating the UE.

In some embodiments, the request to retrieve the indication is sent to a first core node. The first core node is a Unified Data Management, UDM, node.

In some other embodiments, the request to retrieve the indication is sent to a third core nod, and the third core node is an Authentication and Key Management for Applications, AKMA, Anchor Function, AAnF, node.

In one embodiment, the indication is one of a password and a second security key, the second security key being a Kaf security key.

In another embodiment, the authentication vector is a Session Internet Protocol Digest Authentication Vector, SD-AV.

In some embodiments, the private identifier is an Internet Protocol Multimedia Subsystem, IMS, Private User Identity, IMPI.

In some other embodiments, the first IMS node is Home Subscriber Server, HSS, and the second IMS node is a Serving Call Session Control Function, S-CSCF, node.

According to one aspect, first core node for handling authentication of a user equipment, UE, in a communication network. The first core node is configured to receive a request from a first IP multimedia system, IMS, node to retrieve an indication. The request includes a subscription permanent identifier generated from the private identifier. The first core node is further configured to select a second core node that stores a first security key result of a latest authentication of the UE in an access network, send an indication request to the selected second core node. Further, the first core node is configured to receive the indication from the second core node, where the indication is based on a first security key stored in the second core node, and provide the received indication to the first IMS node.

In some embodiments, the indication is a password.

In some other embodiments, the password is a Session Internet Protocol Password, SIP, Digest password.

In one embodiment, the first security key is a Kausf security key.

In another embodiment, the first core node is a Unified Data Management, UDM, node, the second core node is an Authentication Server Function, AUSF, node, and the first IMS node is a Home Subscriber Server, HSS.

According to another aspect, a second core node for handling authentication of a user equipment, UE, in a communication network is described. The second core node is configured to receive an indication request from a first core node, generate an indication based on a first security key result of the latest authentication of the UE in an access network, and send the generated indication to the first core node.

In some embodiments, the second core node is further configured to store a first security key generated from a primary authentication of the UE in an access network.

In some other embodiments, the first security key is a Kausf security key.

In one embodiment, the indication is a password.

In another embodiment, the password is a Session Internet Protocol Password, SIP, Digest password.

IN some embodiments, the first core node is a Unified Data Management, UDM, node, and the second core node is an Authentication Server Function, AUSF, node.

According to one aspect, a third core node for handling authentication of a user equipment, UE, in a communication network. The third core node is configured to receive an indication request from a first IMS node, generate the indication based on an authentication procedure, and send the generated indication to the first IMS node.

In some embodiments, the indication is a second security key.

In some other embodiments, the second security key is a Kaf security key.

In one embodiment, the authentication procedure is an Authentication and Key Agreement for Applications, AKMA, procedure.

In another embodiment, the third core node is an Authentication and Key Management for Applications, AKMA, Anchor Function, AAnF, node, and the first IMS node is a Home Subscriber Server, HSS.

According to another aspect, a User Equipment, UE, for handling authentication of the UE in a communication network. The UE is configured to generate a password based on any one of a stored first security key and a derived second security key. The password is used for authenticating the UE to a network node. The UE is further configured to send a message to a second IMS node for registering the UE to the network node based on the generated password. The message includes a private identifier and a public identifier.

In some embodiments, the UE is further configured to register to an access network by performing a primary authentication procedure, where the access network is part of the communication network, and store the first security key generated from the primary authentication of the UE in the access network.

In some other embodiments, the first security key is a Kausf security key.

In one embodiment, the UE is further configured to derive the second security key from the first security key based on an authentication procedure.

In another embodiment, the second security key is a Kaf security key.

In some embodiments, the authentication procedure is an Authentication and Key Agreement for Applications, AKMA, procedure.

In some other embodiments, the network node is an IP multimedia system, IMS, node, and the second IMS node is a Serving Call Session Control Function, S-CSCF.

In one embodiment, the password is a Session Internet Protocol Password, SIP, Digest password.

In another embodiment, the private identifier is an Internet Protocol Multimedia Subsystem, IMS, Private User Identity, IMPI, and the public identifier is an IMS Public User Identity, IMPU, the IMPI and the IMPU being generated based on a Subscription Permanent Identifier, SUPI.

According to one aspect, a computer program product is described. The computer program product includes instructions, which, when executed on at least one processor, cause the at least one processor to carry out the method of any of the embodiments as performed by the first IMS node, first core node, second core node, third core node, and UE, respectively.

According to another aspect, a computer-readable storage medium is described. The computer-readable storage medium has stored thereon a computer program product including instructions which, when executed on at least one processor, cause the at least one processor to carry out the method of any of the embodiments, as performed by the first IMS node, first core node, second core node, third core node, and UE, respectively.

Throughout this description, the first, second and third core nodes may alternatively be referred to as first, second and third core nodes to indicate that said nodes may be implemented in a core network such as a 5GC.

BRIEF DESCRIPTION OF THE DRAWINGS

Embodiments will now be described in more detail in relation to the enclosed drawings, in which:

FIG. 18 is a schematic block diagram illustrating embodiments of a second access network node according to the principles of the present disclosure;

DETAILED DESCRIPTION

Figure 5:
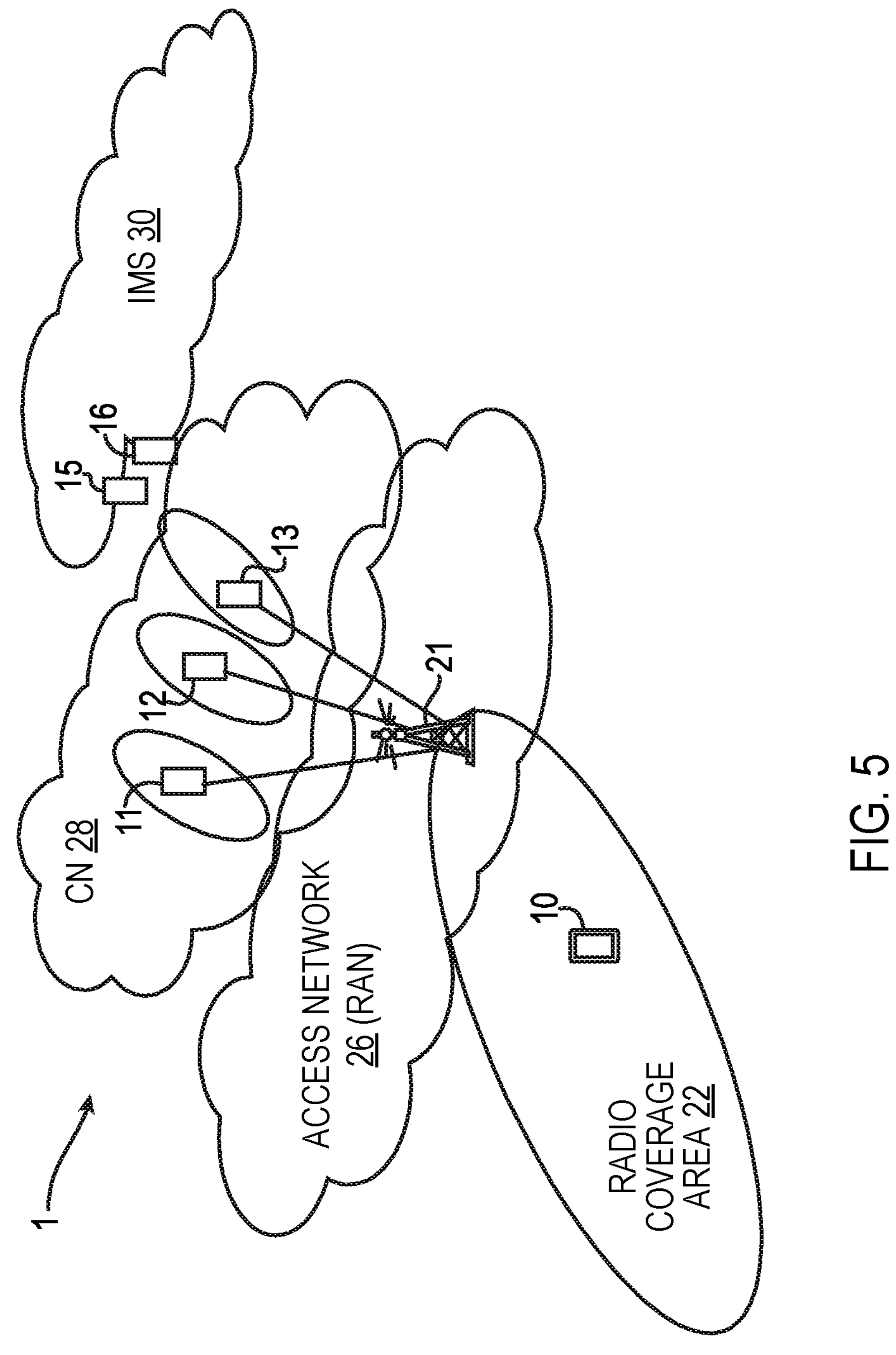
FIG. 5 is a schematic block diagram illustrating embodiments of a communications network according to the principles of the present disclosure.

Embodiments herein relate to communication networks in general. FIG. 5 is a schematic overview depicting a communication network 1. The communication network 1 comprises one or more access networks 26, e.g., a RANs, connected to one or more CNs 28. The communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g., 3G and LTE.

In the communication network 1, UEs, e.g., a UE 10 such as a mobile station, a non-access point (non-AP) STA, a STA, a wireless device and/or a wireless terminal, are connected via the one or more RANs, to the one or more CNs 28, e.g., comprising CN nodes such as a first core node 11, a second core node 12 and a third core node 13 of the CN 28. The first core node 11 may be a Unified Data Management (UDM) node. The UDM node supports the Authentication Credential Repository and Processing Function (ARPF) and stores the long-term security credentials used in authentication for AKA. In addition, the first core node 11, e.g., the UDM node, stores subscription information. The second core node 12 may be an Authentication Server Function (AUSF) node. The second core node 12, e.g., the AUSF node, performs authentication with UEs and makes the decision on the UE authentication. The third core node 13 may be an AKMA Anchor Function (AAnF). The third core node 13, e.g., AAnF, may be an anchor function in the HPLMN that generates the key material to be used between the UE and the AF and maintains UE AKMA contexts to be used for subsequent bootstrapping requests. It should be understood by those skilled in the art that "UE" is a non-limiting term which means any terminal, wireless device (WD), wireless communication terminal, user equipment, Machine Type Communication (MTC) device, Internet of Things operable device, Device to Device (D2D) terminal, mobile device e.g. smart phone, laptop, mobile phone, sensor, relay, mobile tablets or any device communicating within a cell or service area.

The communication network 1 comprises a radio network node 21, which provides providing radio coverage over a geographical area, a coverage area 22, e.g., a radio coverage area, of a first radio access technology (RAT), such as New Radio (NR), LTE, UMTS, Wi-Fi or similar. The radio network node 21 may be a radio core node such as radio network controller or an access point such as a wireless local area network (WLAN) access point or an Access Point Station (AP STA), an access controller, a base station, e.g. a radio base station such as a NodeB, an evolved Node B (eNB, eNodeB), a gNodeB, a base transceiver station, Access Point Base Station, base station router, a transmission arrangement of a radio base station, a stand-alone access point or any other network unit capable of serving a UE within the service area served by the first radio network node 21 depending e.g. on the first radio access technology and terminology used.

The communication network 1 provides IMS services, such as voice over LTE (VoLTE) or similar, and comprises a first IMS node 15 and a second IMS node 16 of an IMS 30. The first IMS node 15 may be a Home Subscriber Server (HSS). The second IMS node 16 may be a Call Session Control Function (CSCF) node such as a serving-CSCF (S-CSCF) node. The IMS 30, e.g., an IMS network, may comprise a Call Session Control Function (CSCF) node and a Home Subscriber Server (HSS). The Call session control function e.g., facilitates Session Internet Protocol (SIP) setup and teardown, and the HSS plays the role of a location server in IMS, in addition to acting as an authentication, authorization, accounting (AAA) server. The CSCF may comprise a number of distributed functions e.g., a proxy CSCF node (P-CSCF), an Interrogating CSCF (I-CSCF) node, and a Serving CSCF (S-CSCF) node. The P-CSCF acts as the entry point in the IMS network. The HSS is the main database of the current generation's cellular communications systems. It contains subscriber-related information, such as the authentication information and the list of services to which each user is subscribed.

Embodiments herein enable to execute the authentication of the UE in the IMS domain of the PLMN using a SIP Digest method using credentials generated during the primary authentication of the UE in the 5GC of the SNPN rather than having a need to provision the UE with additional credential or similar.

The SUPI used during the primary authentication procedure in the 5GC of the SNPN is used as for the execution of a SIP Digest authentication at the IMS domain of the PLMN. A first security key, e.g., Kausf, generated during the primary authentication procedure in the 5GC of the SNPN is used to generate a password input for the SIP Digest authentication.

An advantage that may be achieved with the embodiments herein is that a mechanism is provided to support an authentication mechanism in 5GC for devices that cannot host a Universal Integrated Circuit Card (UICC), e.g., a Subscriber Identity Module (SIM) card, or cannot use IMSI-AKA based security mechanisms. Supporting the authentication mechanism this way enables a simple, yet secured authentication mechanism for access to the IMS domain to UEs.

It is worth noting that the process to generate a digest password from the Kausf according to embodiments herein increases security of the SIP Digest process compared to the use of static passwords as Kausf is refreshed at every primary authentication.

Figure 6A:
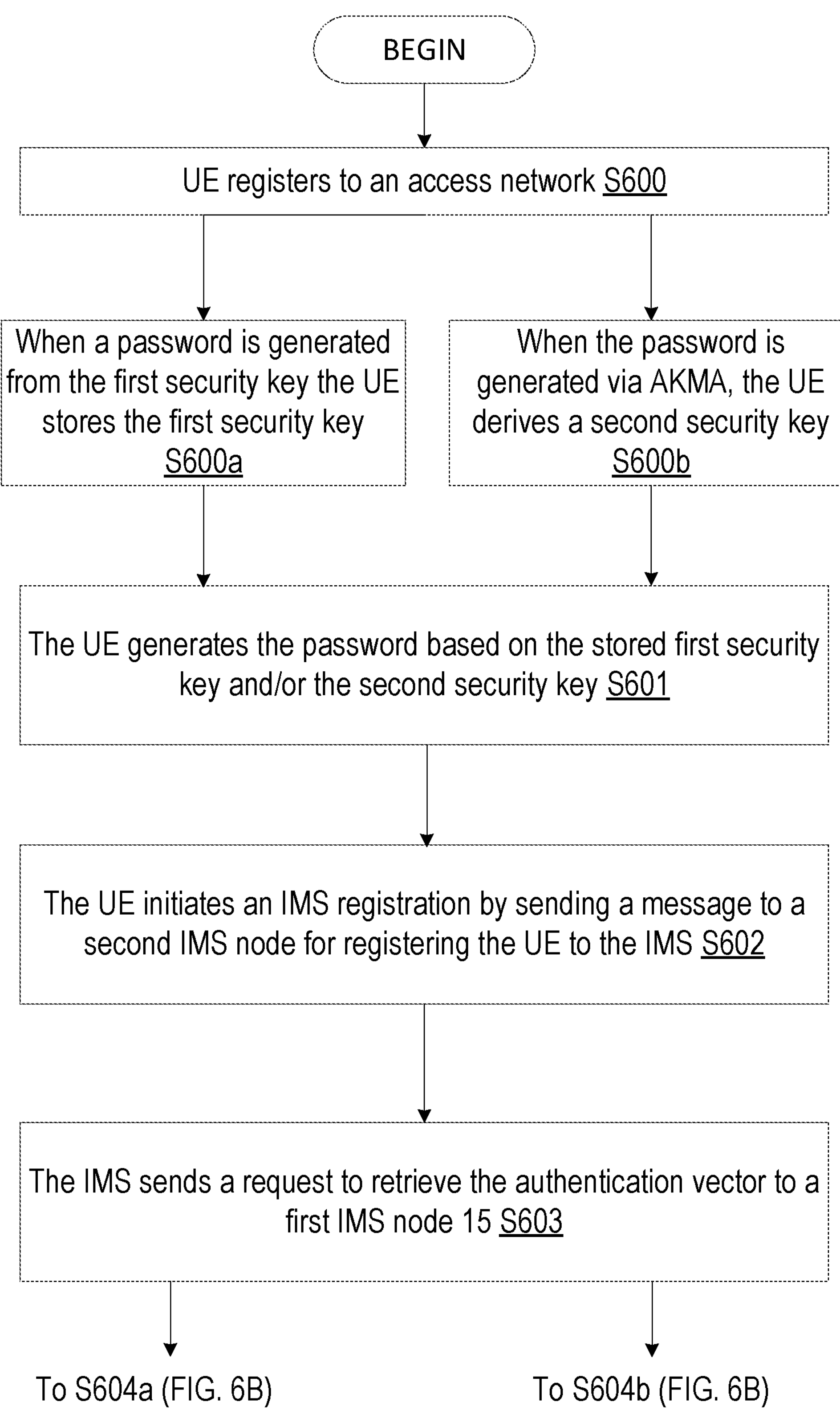
FIG. 6 is a combined signalling scheme and flowchart according to the principles of the present disclosure.
Figure 6B:
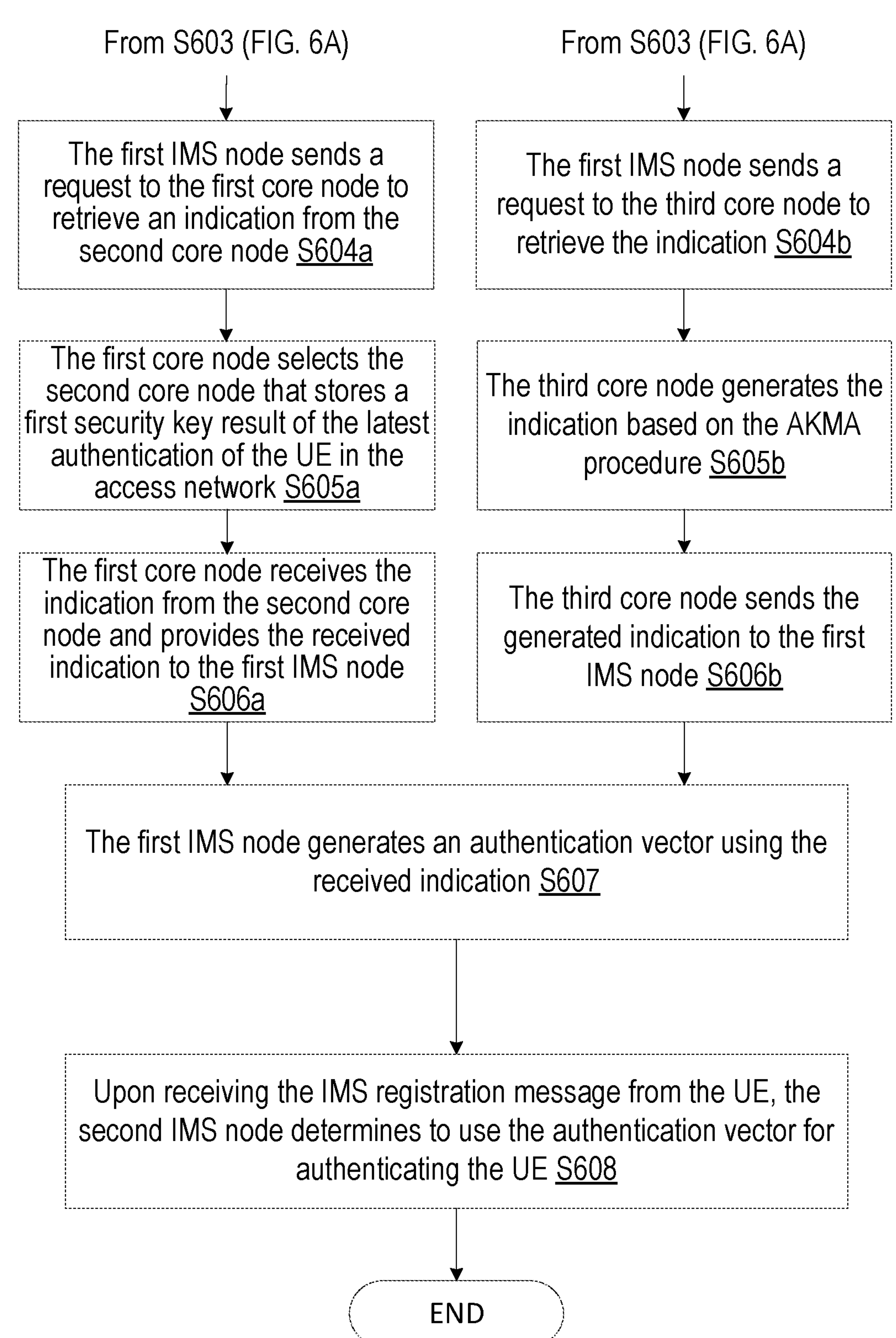

FIG. 6 is a combined flowchart and signalling scheme according to some embodiments herein.

Step S600.

Figure 1:
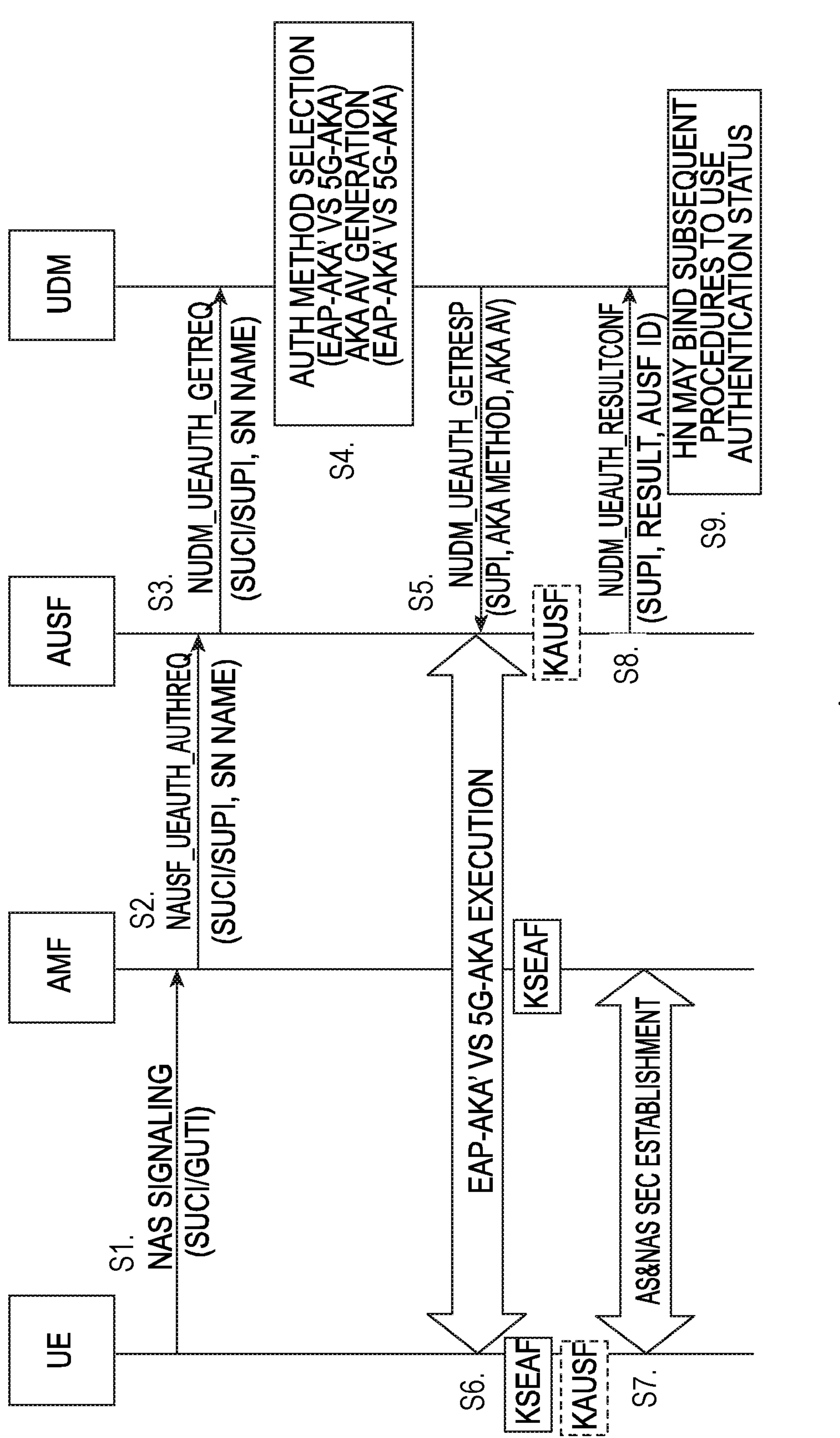
FIG. 1 is a schematic overview of a primary authentication process.
Figure 2:
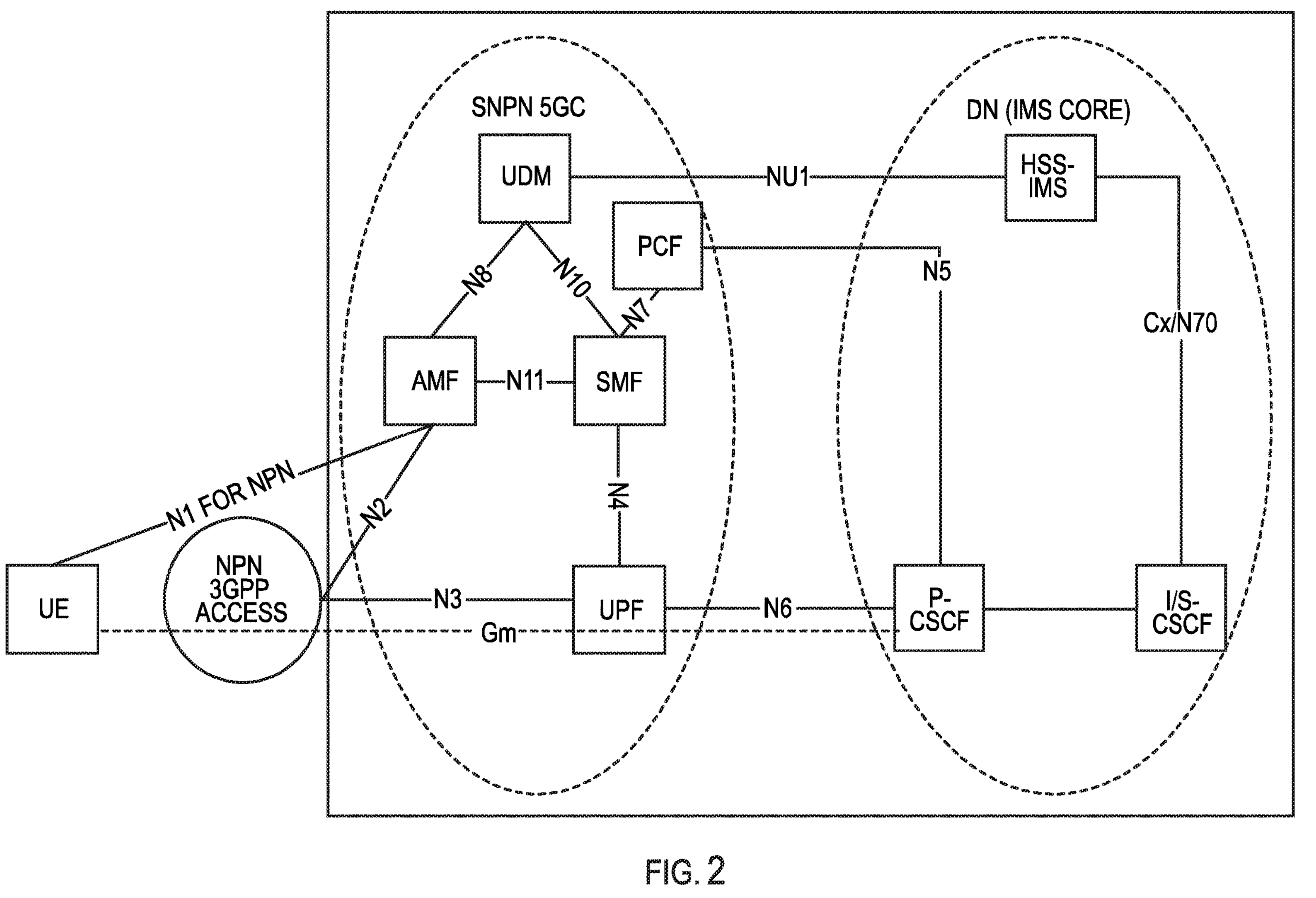
FIG. 2 is a schematic overview of an example to reuse UE credentials used for UE authentication in the 5GC of the SNPN for IMS level authentication at the PLMN.
Figure 3:
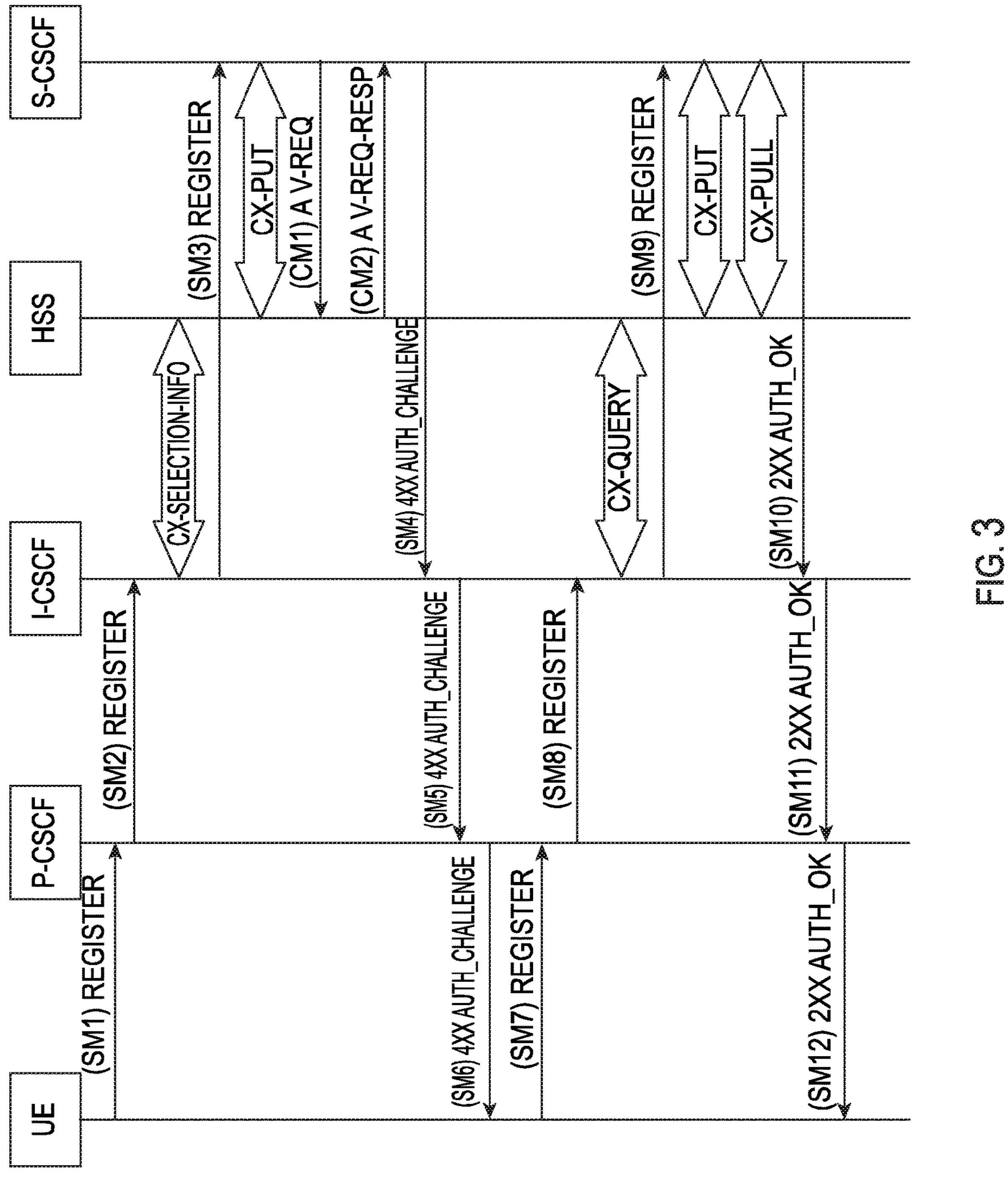
FIG. 3 is a schematic overview of an authentication mechanism in IMS.

The UE 10 first registers to an access network 26, e.g., 5G, during a primary authentication procedure, which authentication procedure was described further in detail above in FIG. 1. The registration corresponds to step S1101. The second core node 12, e.g., AUSF, stores a first security key which was generated during the primary authentication process. The first security key may be a Kausf. This corresponds to step S901.

Step S600*a*.

In situations when a password, e.g., a SIP Digest password, is generated from the first security key the UE 10 stores the first security key, which was generated during the primary authentication process. This corresponds to step S1102.

Step S600*b*.

In situations when the password is generated via AKMA, the UE 10 derives a second security key, e.g., Kaf, from the first security key, e.g., Kausf, based on an AKMA procedure. This corresponds to step S1103.

Step S601.

The UE 10 generates the password based on the stored first security key or the second security key, which will be used for authenticating the UE to an IMS. This corresponds to step S1104.

Step S602.

The UE 10 initiates an IMS registration by sending a message to, a second IMS node 16, e.g., an S-CSCF, for registering the UE 10 to the IMS, based on the password generated during the primary authentication to the access network 26. The message comprises a private identifier and a public identifier IMPU. The private identifier may be an IMPI, and the public identifier may be an IMPU. This corresponds to step S1105. The IMPI and/or IMPU are generated based on subscription permanent identifier (SUPI) used by the UE 10 during the primary authentication procedure.

Step S603.

Upon receiving the IMS registration message from the UE 10, the second IMS node 16 wants to use an authentication vector for authenticating the UE 10. The authentication vector may be a SIP Digest Authentication Vector (SD-AV). The second IMS node 16 therefore sends a request to retrieve the authentication vector to a first IMS node 15, e.g., an HSS. The request comprises the private identifier generated from the subscription permanent identifier.

Steps S604*a*, S605*a* and S606*a* below concern situations where the password is generated from the first security key.

Step S604*a*.

When the first IMS node 15 receives the request from second IMS node 16 to retrieve an authentication vector, the first IMS node 15 wants to generate the authentication vector based on the first security key generated during the primary authentication of the UE 10. The first IMS node 15 will therefore send a request to the first core node 11, e.g., UDM, to retrieve an indication from the second core node 12. The indication may be a password, e.g., a SIP Digest password. This corresponds to steps S701 and S702.

Step S605*a*.

The first core node 11 receives the request, from the first IMS node 15, to retrieve an indication. The indication may be a password, e.g., a SIP Digest password. The request comprises a subscription permanent identifier generated from the private identifier. This corresponds to step S801. The first core node 11 then selects the second core node that stores a first security key result of the latest authentication of the UE 10 in the access network. This corresponds to step S802. The first core node 11 then sends a request to the selected second core node 12 to generate an indication. This corresponds to step S803. The second core node 12 receives the indication request from the first core node. This corresponds to step 902. The second core node 12 then generates an indication, based on a first security key result of the latest authentication of the UE 10 in the access network 26. This corresponds to step S903. The second core node 12 then sends the generated indication to the first core node 11. This corresponds to step S904.

Step S606*a*.

The first core node 11 receives the indication from the second core node 12, wherein the indication is based on a first security key, stored in the second core node 12. This corresponds to step S804. The first core node 11 provides the received indication, e.g., SIP Digest password, generated by the second core node 12, to the first IMS node 15. This corresponds to step S805.

Steps S604*b*, S605*b* and S606*b* below concern situations where the password is generated via AKMA.

Step S604*b*.

When the first IMS node 15 receives the request from the second IMS node 16 to retrieve the authentication vector, the first IMS node 15 wants to generate the authentication vector based on the second security key, which may be a Kaf, retrieved from an AKMA infrastructure of the 5GC of the SNPN. For that, the first IMS node 15 behaves as an Application Function (AF) in the AKMA architecture and sends a request to the third core node 13, e.g., AAnF, to retrieve the indication. In this case the indication may be a second security key. This corresponds to steps S701 and S702.

Step S605*b*.

The third core node 13 receives the indication request from the first IMS node 15. This corresponds to step S1001. The third core node 13 then generates the indication based on the AKMA procedure. The indication may be the second security key such as a Kaf. This corresponds to step S1002.

Step S606*b*.

The third core node 13 then sends the generated indication, e.g. second security key, to the first IMS node 15. This corresponds to step S1003.

Step S607.

The first IMS node 15 receives the indication from either the first core node 11 or third core node 13. This corresponds to step S703. The first IMS node 15 then generates the authentication vector using the received indication. This corresponds to step S704.

The first IMS node 15 sends the generated authentication vector to the second IMS node 16 for authenticating the UE 10. This corresponds to step S705.

The steps in FIG. 6 above enable a simple authentication mechanism for access to the IMS domain to UEs which do not support AKA-based identifiers and credentials, e.g., SNPN UEs.

In some embodiments, the UE 10 provides to an IMS (e.g., S-CSCF) node an IMS Private Identifier (IMPI) during IMS registration. The IMPI may be derived from a permanent identifier (SUPI) by the UE 10. The IMS (e.g., S-CSCF) node may use the IMPI toward an HSS node for authentication and IMS registration. HSS uses a permanent identifier, such as SUPI, for further interaction between the HSS and an UDM node. With respect to step S601, the HSS node may receive from the IMS (e.g., S-CSCF) node an IMPI where the IMPI may be derived from a permanent identifier and provided to the IMS (e.g., the S-CSCF) by the UE 10. With respect to step 602, the HSS node may send the request to UDM node where the request includes a permanent identifier (SUPI) which is generated based on the received IMPI of step S601.

Figure 7:
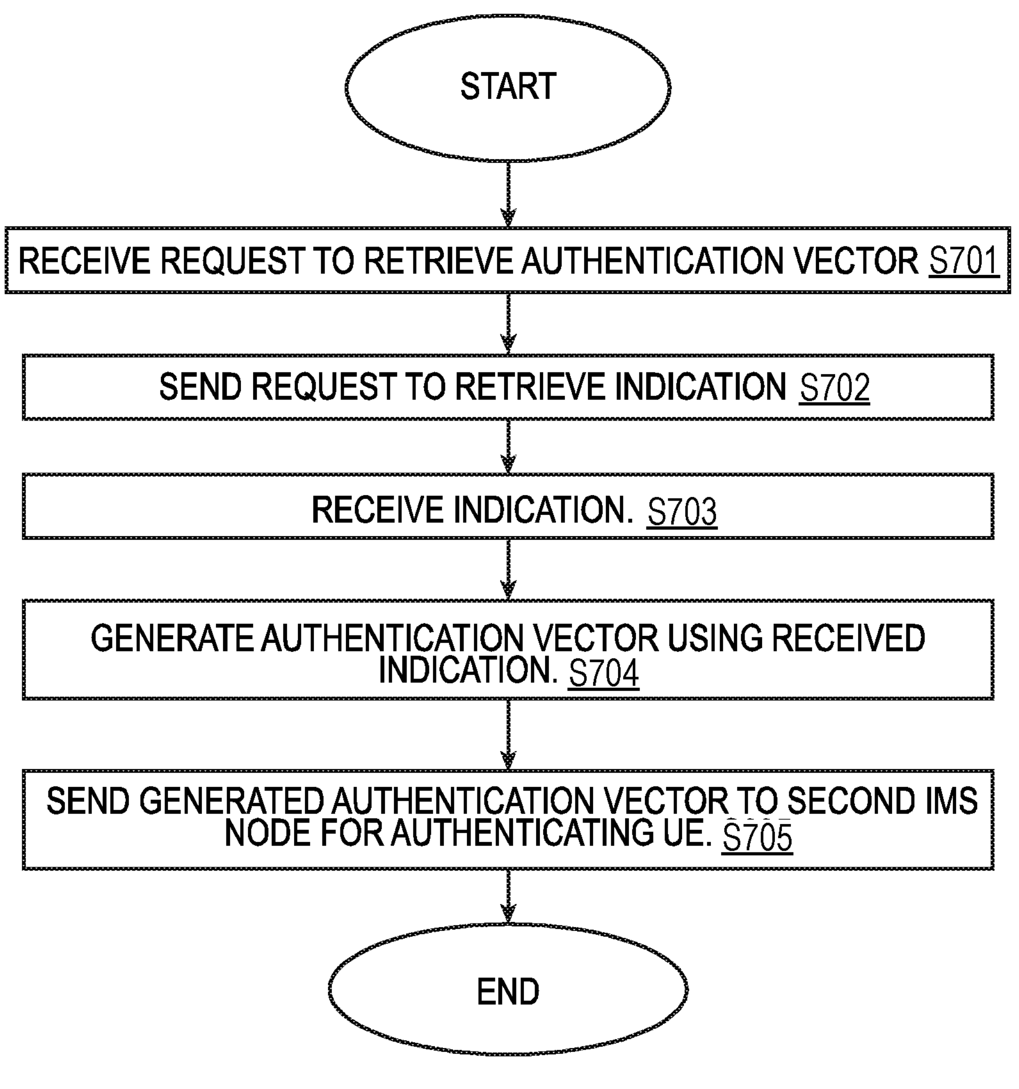
FIG. 7 is a flowchart depicting embodiments of a method in a first IMS node according to the principles of the present disclosure.

Example embodiments of a method performed by the first IMS node 15 for handling authentication of the UE 10 in the communication network will now be described with reference to a flowchart depicted in FIG. 7. The steps described below do not have to be performed in the order stated below and may be performed in any suitable order.

Step S701. The first IMS node 15, e.g., a HSS, first receives a request from the second IMS node 16 to retrieve an authentication vector, wherein the request comprises a private identifier generated from a subscription permanent identifier Step S702. The first IMS node sends a request to retrieve the indication, wherein the request comprises the subscription permanent identifier generated from the private identifier. In some embodiments, the request to retrieve the indication may be sent to the first core node 11. In some embodiments the request to retrieve the indication may be sent to the third core node 13.

Step S703. The first IMS node 15 then receives the indication. The indication may be received from the first core node 11 and/or the third core node 13. In some embodiments, the indication may be a password and/or a second security key.

Step S704. The first IMS node 15 then generates the authentication vector using the received indication. The authentication vector may be the SIP Digest Authentication Vector (SD-AV).

Step S705. The first IMS node 15 sends the generated authentication vector to the second IMS node 16 for authenticating the UE 10.

More specifically, one or more blocks (referred to as steps above) described herein may be performed by one or more elements of the IMS node 15 such as by one or more of processing circuitry 1501 (including the receiving unit 1502, sending unit 1503, and/or generating unit 1504), memory 1507 and/or communication interface 1510. The first IMS node 15 such as via processing circuitry 1501 and/or communication interface 1510 is configured to receive (Block S701) a request from a second IMS node (16) to retrieve an authentication vector, where the request to retrieve the authentication includes a private identifier generated from a subscription permanent identifier, and send (Block S702) a request to retrieve an indication. The request to retrieve the indication includes the subscription permanent identifier. The first IMS node 15 such as via processing circuitry 1501 and/or communication interface 1510 is further configured to receive (Block S703) the indication, generate (Block S704) the authentication vector using the received indication, and send (Block S705) the generated authentication vector to the second IMS node (16) for authenticating the UE.

In some embodiments, the request to retrieve the indication is sent to a first core node 11, where the first core node 11 is a Unified Data Management, UDM, node.

In some other embodiments, the request to retrieve the indication is sent to a third core node 13, and the third core node 13 is an Authentication and Key Management for Applications, AKMA, Anchor Function, AAnF, node.

In one embodiment, the indication is one of a password and a second security key, the second security key being a Kaf security key.

In another embodiment, the authentication vector is a Session Internet Protocol Digest Authentication Vector, SD-AV.

In some embodiments, the private identifier is an Internet Protocol Multimedia Subsystem, IMS, Private User Identity, IMPI.

In some other embodiments, the first IMS node 15 is a Home Subscriber Server, HSS, and the second IMS node is a Serving Call Session Control Function, S-CSCF, node.

Figure 8:
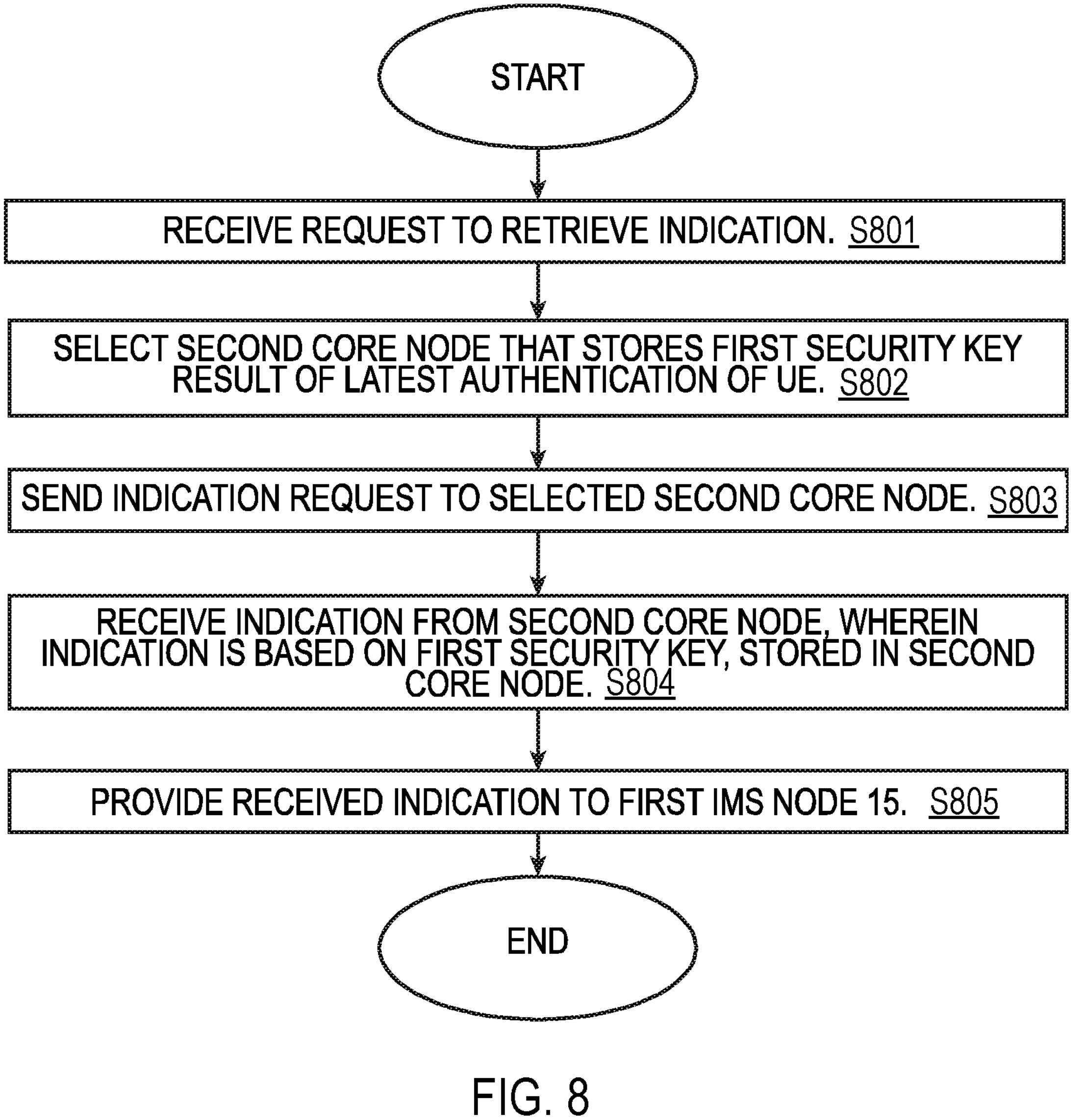
FIG. 8 is a flowchart depicting embodiments of a method in a first access network node according to the principles of the present disclosure.

Example embodiments of a method performed by the first core node 11 for handling authentication of the UE 10 in the communication network will now be described with reference to a flowchart depicted in FIG. 8. The steps do not have to be performed in the order stated below and may be performed in any suitable order.

Step S801. The first core node 11, e.g., a UDM, receives the request from the first IP multimedia system, IMS node 15 to retrieve the indication, wherein the request comprises the subscription permanent identifier generated from the private identifier.

Step S802. The first core node 11 selects the second core node 12, which stores a first security key result of a latest authentication of the UE in the access network.

Step S803. The first core node 11 sends the indication request to the selected second core node 12.

Step S804. The first core node 11 receives the indication from the second core node 12, wherein the indication is based on the first security key, stored in the second core node 12. In some embodiments the indication may be a password.

Step S805. The first core node 11 provides the received indication to the first IMS node 15.

More specifically, one or more blocks (referred to as steps above) described herein may be performed by one or more elements of the first core node 11 such as by one or more of processing circuitry 1601 (including the receiving unit 1602, selecting unit 1603, sending unit 1604, and providing unit 1605), memory 1607 and/or communication interface 1610. The first core node 11 such as via processing circuitry 1601 and/or communication interface 1610 is configured to receive (Block S801) a request from a first IP multimedia system, IMS, node 15 to retrieve an indication, where the request includes a subscription permanent identifier generated from the private identifier, selects (Block S802) a second core node 12 that stores a first security key result of a latest authentication of the UE in an access network, and sends (Block S803) an indication request to the selected second core node 12. The first core node 11 such as via processing circuitry 1601 and/or communication interface 1610 is further configured to receive (Block S804) the indication from the second core node 12, where the indication is based on a first security key stored in the second core node 12, and providing (Block S805) the received indication to the first IMS node 15.

In some embodiments, the indication is a password.

In some other embodiments, the password is a Session Internet Protocol Password, SIP, Digest password.

In one embodiment, the first security key is a Kausf security key.

In another embodiment, the first core node 11 is a Unified Data Management, UDM, node, the second core node 12 is an Authentication Server Function, AUSF, node, and the first IMS node 15 is a Home Subscriber Server, HSS.

Figure 9:
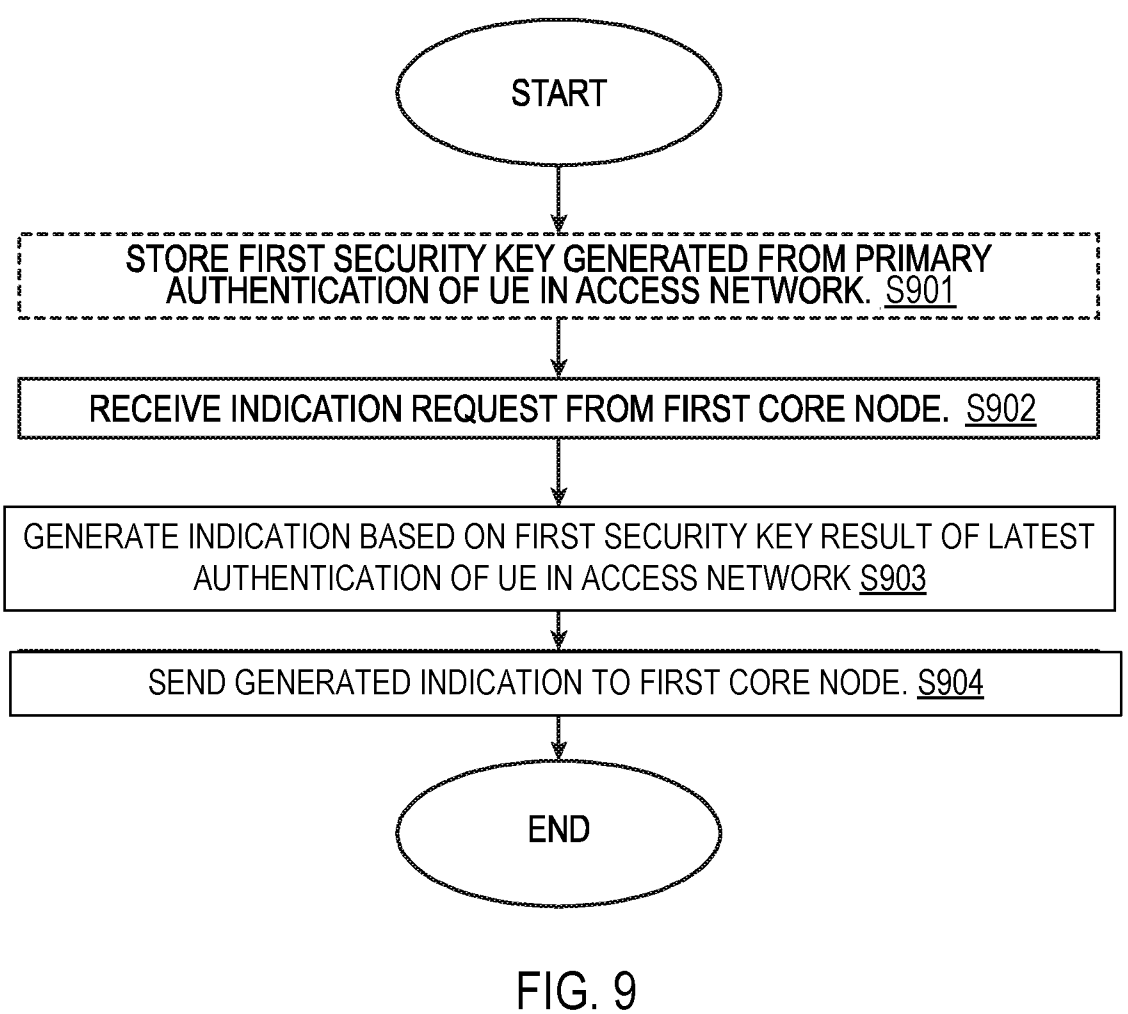
FIG. 9 is a flowchart depicting embodiments of a method in a second access network node according to the principles of the present disclosure.

Example embodiments of a method performed by the second core node 12 for handling authentication of the UE 10 in the communication network will now be described with reference to a flowchart depicted in FIG. 9. The steps do not have to be performed in the order stated below and may be performed in any suitable order. Optional steps that may be performed in some embodiments are marked with dashed boxes.

Step S901. In some embodiments, the second core node 12, e.g., AUSF, may store the first security key generated from the primary authentication of the UE in the access network.

Step S902. The second core node 12 receives the indication request from the first core node 11.

Step S903. The second core node 12 then generates the indication based on the first security key result of the latest authentication of the UE in the access network. In some embodiments the indication may be a password.

Step S904. The second core node 12 then sends the generated indication to the first core node 11.

More specifically, one or more blocks (referred to as steps above) described herein may be performed by one or more elements of the second core node 12 such as by one or more of processing circuitry 1701 (including the receiving unit 1702, generating unit 1703, sending unit 1704, and/or storing unit 1705), memory 1707 and/or communication interface 1710. The second core node 12 such as via processing circuitry 1701 and/or communication interface 1710 is configured to receive (Block S902) an indication request from a first core node 11, generate (Block S903) an indication based on a first security key result of the latest authentication of the UE in an access network, and send (Block S904) the generated indication to the first core node 11.

In some embodiments, the second core node 12 such as via processing circuitry 1701 and/or communication interface 1710 is further configured to store (Block S901) a first security key generated from a primary authentication of the UE in an access network.

In some other embodiments, the first security key is a Kausf security key.

In one embodiment, the indication is a password.

In another embodiment, the password is a Session Internet Protocol Password, SIP, Digest password.

In some embodiments, the first core node 11 is a Unified Data Management, UDM, node, and the second core node 12 is an Authentication Server Function, AUSF, node.

Figure 10:
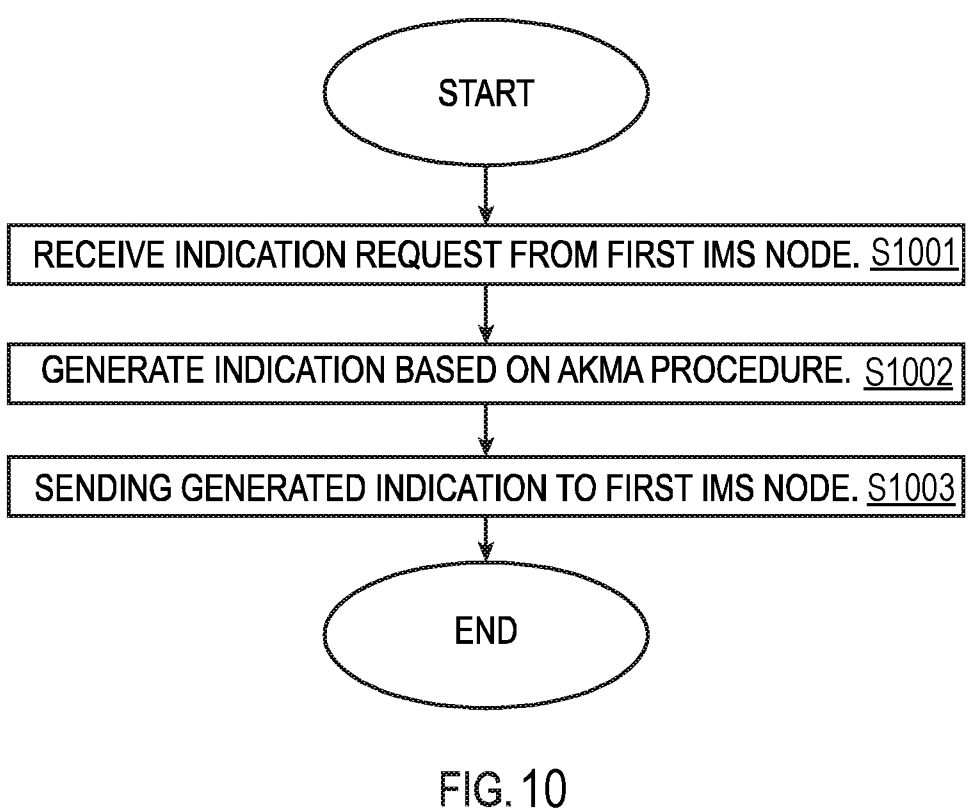
FIG. 10 is a flowchart depicting embodiments of a method in a third access network node according to the principles of the present disclosure.

Example embodiments of a method performed by the third core node 13 for handling authentication of the UE 10 in the communication network will now be described with reference to a flowchart depicted in FIG. 10. The steps do not have to be performed in the order stated below and may be performed in any suitable order.

Step S1001. The third core node 13, e.g., AAnF, first receives the indication request from the first IMS node 15, e.g., an HSS node, which may use a permanent identifier such as SUFI.

Step S1002. The third core node 13 then generates the indication based on the AKMA procedure. In some embodiments the indication may be a second security key.

Step S1003. The third core node 13 sends the generated indication to the first IMS node 15.

More specifically, one or more blocks (referred to as steps above) described herein may be performed by one or more elements of the third core node 13 such as by one or more of processing circuitry 1801 (including the receiving unit 1802, generating unit 1803, and/or sending unit 1804), memory 1807 and/or communication interface 1810. The third core node 13 such as via processing circuitry 1801 and/or communication interface 1810 is configured to receive (Block S1001) an indication request from a first IMS node 15, generate (Block S1002) the indication based on an authentication procedure, and send (Block S1003) the generated indication to the first IMS node 15.

In some embodiments, the indication is a second security key.

In some other embodiments, the second security key is a Kaf security key.

In one embodiment, the authentication procedure is an Authentication and Key Agreement for Applications, AKMA, procedure.

In another embodiment, the third core node 13 is an Authentication and Key Management for Applications, AKMA, Anchor Function, AAnF, node, and the first IMS node 15 is a Home Subscriber Server, HSS.

Figure 11:
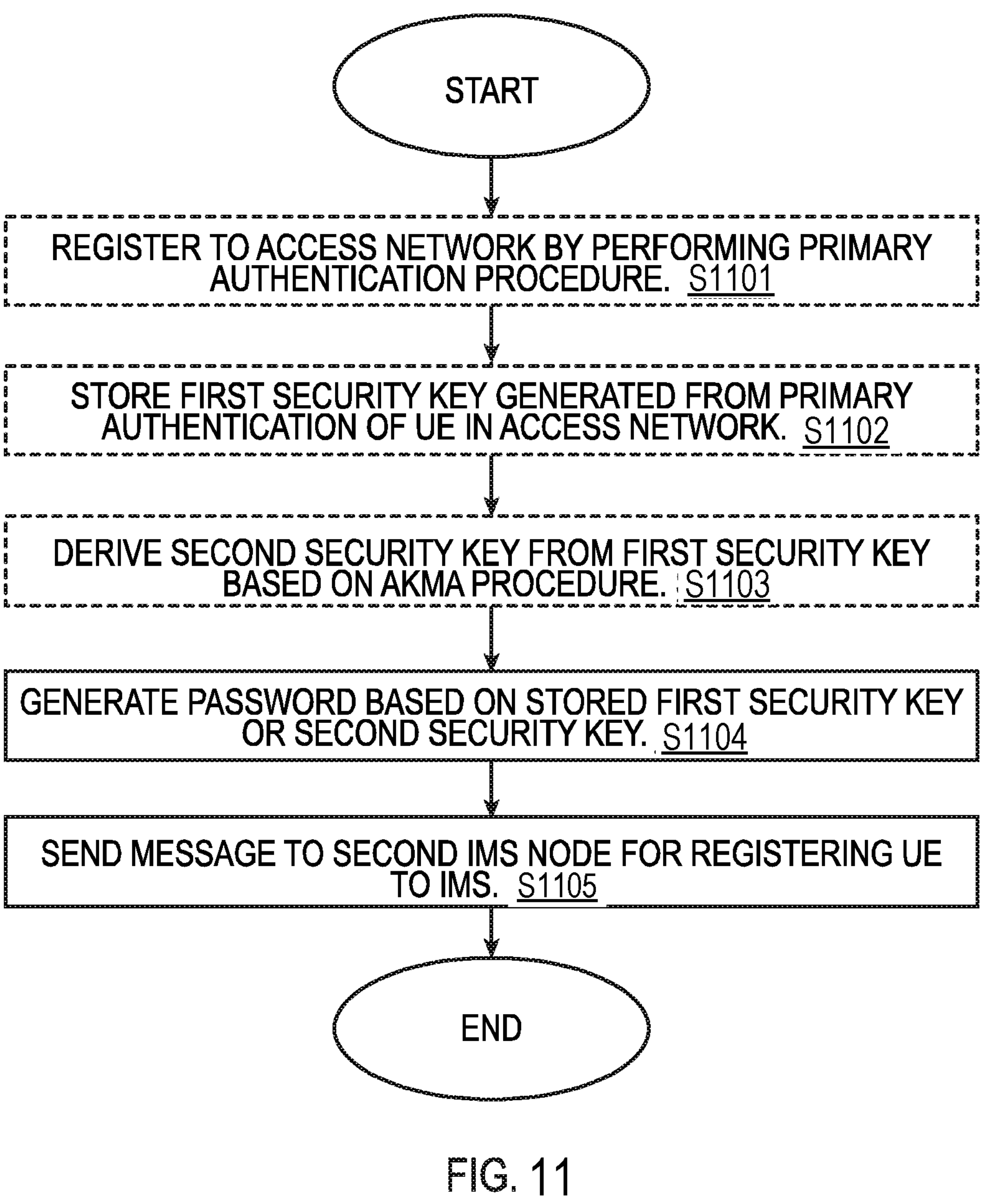
FIG. 11 is a flowchart depicting embodiments of a method in a UE according to the principles of the present disclosure.

Example embodiments of a method performed by the UE 10 for handling authentication of the UE 10 in the communication network will now be described with reference to a flowchart depicted in FIG. 11. The steps do not have to be performed in the order stated below and may be performed in any suitable order. Optional steps that may be performed in some embodiments are marked with dashed boxes.

Step S1101. According to some embodiments, the UE 10 may first register to the access network 26 by performing the primary authentication procedure.

Step S1102. According to some embodiments, the UE 10 may then store the first security key generated from the primary authentication of the UE 10 in the access network 26.

Step S1103. According to some embodiments, the UE 10 may then derive the second security key from the first security key based on the AKMA procedure.

Step S1104. The UE 10 then generates the password based on the stored first security key or second security key which will be used for authenticating the UE to the IMS.

Step S1105. The UE 10 sends the message to the second IMS node, e.g., S-CSCF, for registering the UE 10 to the IMS, based on the password generated during the primary authentication to the access network. The message comprises the private identifier and the public identifier.

More specifically, one or more blocks (referred to as steps above) described herein may be performed by one or more elements of the UE 10 such as by one or more of processing circuitry 1901 (including the registering unit 1902, storing unit 1903, deriving unit 1904, generating unit 1904, and/or sending unit 1906), memory 1907 and/or communication interface 1910. The UE 10 such as via processing circuitry 1901 and/or communication interface 1910 is configured to generate (Block S1104) a password based on any one of a stored first security key and a derived second security key, the password being used for authenticating the UE 10 to a network node and send (Block S1105) a message, to a second IMS node for registering the UE 10 to the network node based on the generated password. The message comprising a private identifier and a public identifier.

In some embodiments, the UE 10 such as via processing circuitry 1901 and/or communication interface 1910 is further configured to register (Block S1101) to an access network by performing a primary authentication procedure, where the access network is part of the communication network, and store (Block S1102) the first security key generated from the primary authentication of the UE 10 in the access network.

In some other embodiments, the first security key is a Kausf security key.

In one embodiment, the UE 10 such as via processing circuitry 1901 and/or communication interface 1910 is configured to derive (Block S1003) the second security key from the first security key based on an authentication procedure.

In another embodiment, the second security key is a Kaf security key.

In some embodiments, the authentication procedure is an Authentication and Key Agreement for Applications, AKMA, procedure.

In some other embodiments, the network node is an IP multimedia system, IMS, node, and the second IMS node is a Serving Call Session Control Function, S-CSCF.

In one embodiment, the password is a Session Internet Protocol Password, SIP, Digest password.

In another embodiment, the private identifier is an Internet Protocol Multimedia Subsystem, IMS, Private User Identity, IMPI, and the public identifier is an IMS Public User Identity, IMPU, the IMPI and the IMPU being generated based on a Subscription Permanent Identifier, SUPI.

Some of the embodiments herein, as mentioned above, will now be further described and exemplified. The text below is applicable to and may be combined with any suitable embodiment(s) described above.

A mechanism is described to support authentication for access to the IMS domain to UEs which do not support AKA-based identifiers and credentials, e.g., SNPN UEs, when using 5GC access. The proposed mechanism is based on using SIP Digests with password based on the Kausf generated during primary authentication of the UE in the 5GC of the SNPN.

Figure 12:
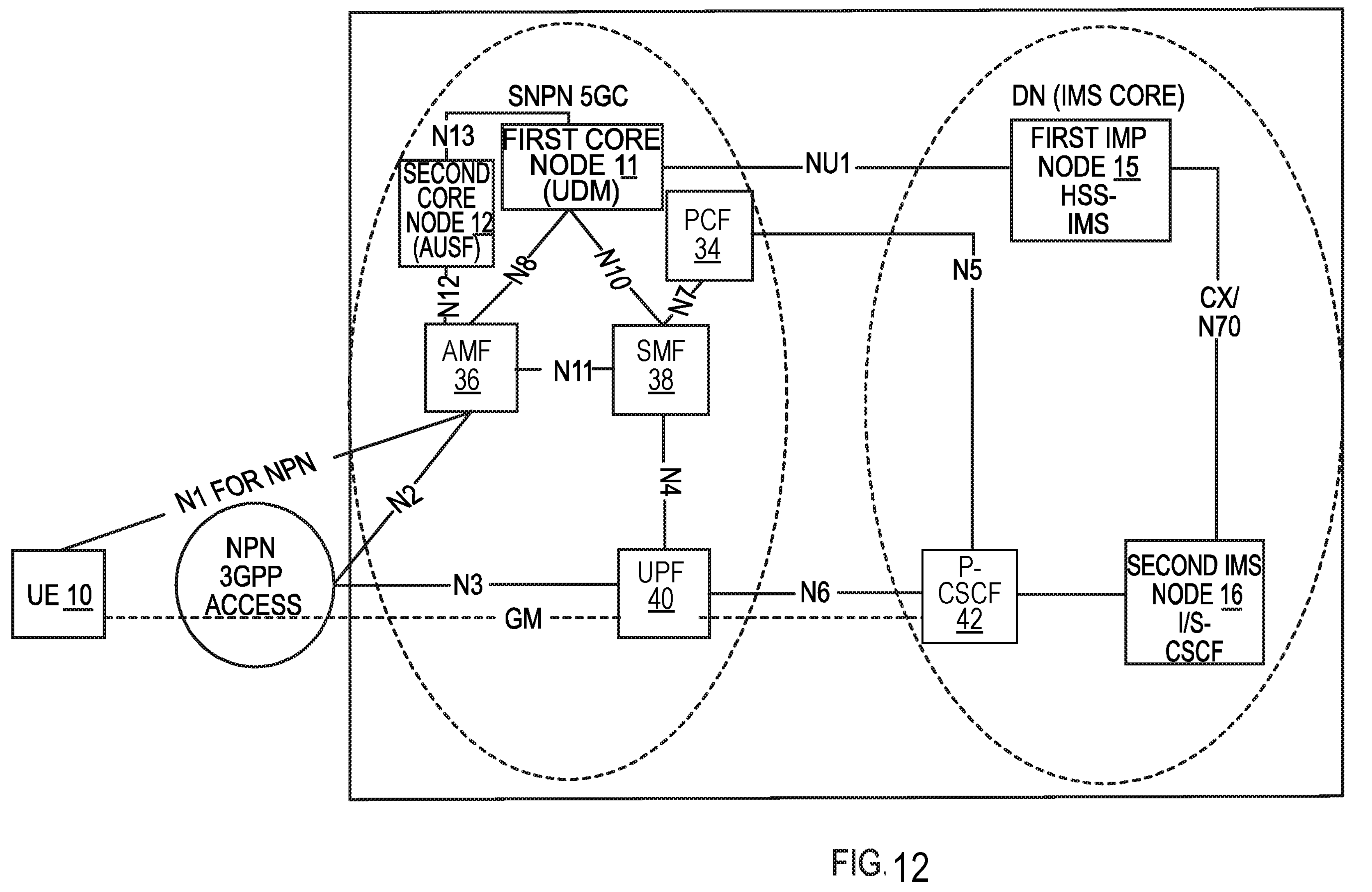
FIG. 12 is a schematic overview depicting a reference architecture for the procedure to enabling access to the IMS domain according to the principles of the present disclosure.

FIG. 12 shows the access to IMS services via Stand-alone Non-Public Network (SNPN) based on Kausf. More specifically, FIG. 12 depicts a reference architecture for an example process used to enable access to the IMS domain to UEs 10 which do not support AKA-based identifiers and credentials, e.g., when using 5GC access.

The first IMS node 15 is exemplified herein as the HSS-IMS node.

The first core node 11 is exemplified herein as the UDM node.

The second core node 12 is exemplified herein as the AUSF node.

The third core node 13 is exemplified herein as the AAnF node.

The second IMS node 16 exemplified herein as the IMS Core node or the S-CSCF node.

Policy Control Function (PCF) node 34 may refer to a logical policy decision element that uses IP processes to implement policy in an IP media layer. Access and Mobility Management Function (AMF) 36 may initiate a primary authentication process. A Service Media/Management Function (SMF) node 38 may support a packet data unit session. Use Plane Functionality (UPF) 40, which may route/forward packets and perform packet inspections. Proxy Call Session Control Function (P-CSCF) 42 may act as an entry point to the IMS network.

The main principle in FIG. 12 is that:

- UE 10, e.g., SNPN UE, generates an IMPI—IMS Private User Identity, in NAI format, and an IMPU—IMS Public User Identity based on the SUPI used by the UE 10, e.g., the SNPN UE, to access the SNPN 5GC. This SUPI based IMPI/IMPU pair is used during IMS registration, including emergency registration. The SUPI based IMPU is barred for call session establishment.
- For execution of the IMS level authentication using SIP Digest authentication the UE 10, e.g., the SNPN UE, uses the IMPI generated from the SNPN SUPI as username. Additionally, the UE generates a SIP password from the Kausf generated during the primary authentication of the UE 10 in the 5GC of the SNPN.

The Kausf is not used directly as the password for the SIP Digest as the Kausf is used also in the context of other procedures so principles for key separation apply. The details of how the UE 10 generates the SIP Digest password from the Kausf are not covered in this specification but it is assumed that this can be done using a Key Derivation Function (KDF) similar to the one used by the UE 10 to generate SoR-MAC-IUE as defined in 3GPP TS 33.501.

- In the IMS core network side, the S-CSCF runs the SIP Digest authentication by comparing the password provided by the UE 10 with the one received from the HSS as defined in current SIP Digest procedure defined in 3GPP TS 33.203. This solution according to embodiments herein, proposes that the HSS fetches the SIP Digest password from the AUSF via the UDM in the 5GC of the SNPN over the NU1 reference point.

Figure 13:
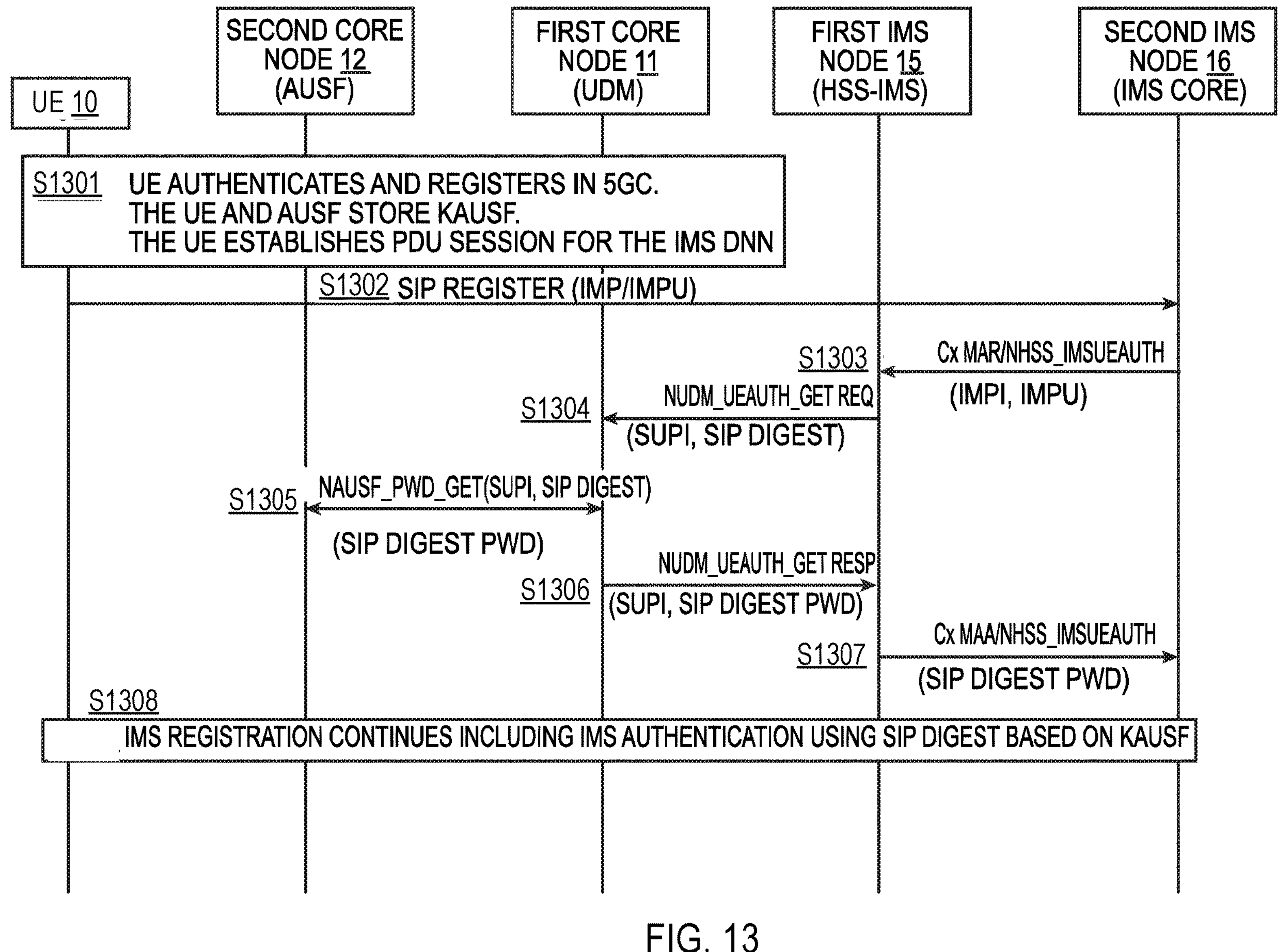
FIG. 13 is a combined signalling scheme and flowchart according to the principles of the present disclosure.
Figure 15:
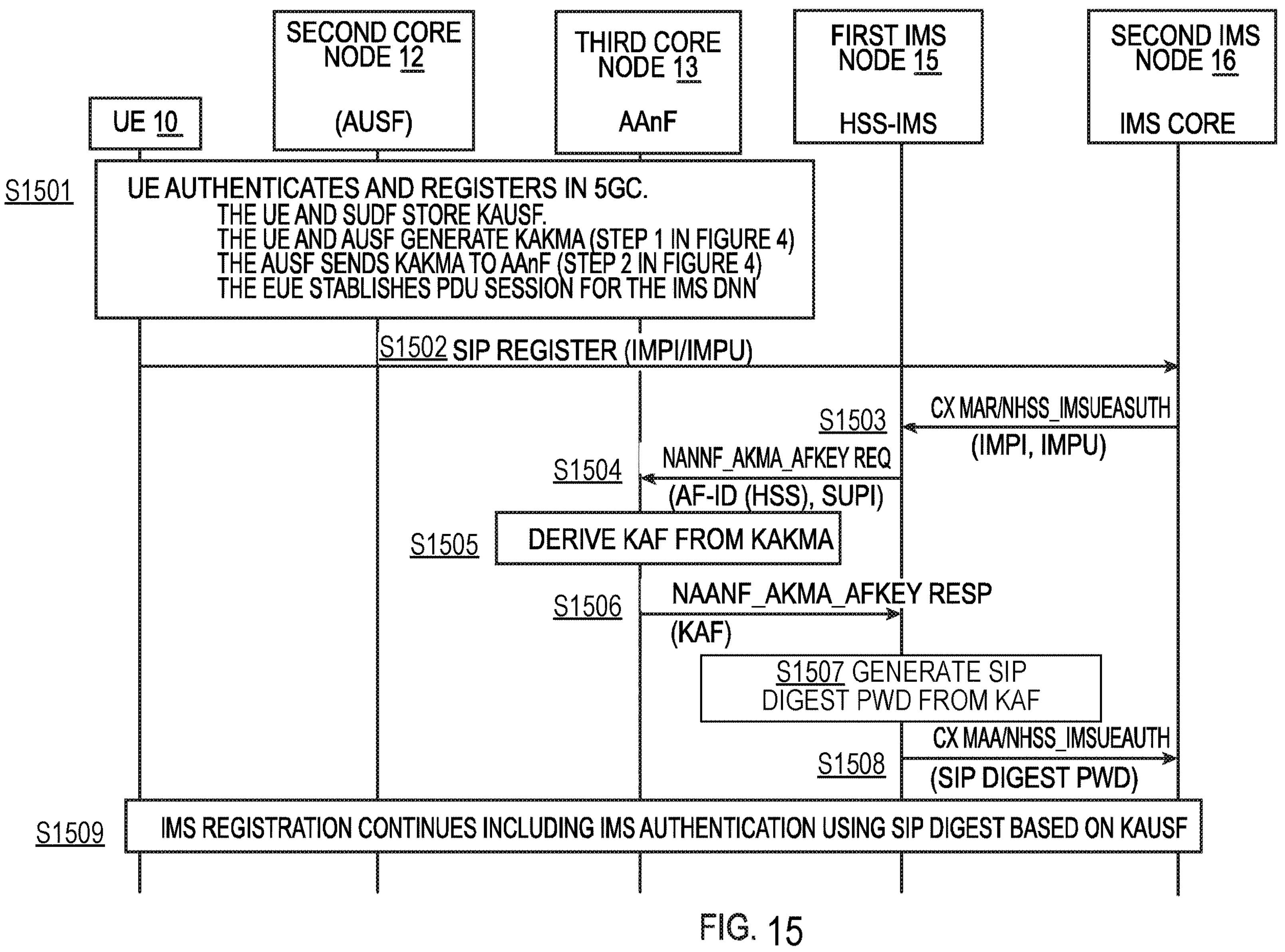
FIG. 15 is another combined signalling scheme and flowchart according to the principles of the present disclosure.

Embodiments herein show two different mechanisms to generate passwords for SIP Digest based on Kausf:

Generation of SIP Digest passwords from Kausf as illustrated in FIG. 13; and Generation of SIP Digest via AKMA as illustrated in FIG. 15.

FIG. 13 depicts, according to some embodiments herein, the flow for the IMS authentication using the SIP Digest password generated based on the security key, e.g., Kausf, and comprises the following actions.

The first IMS node 15 is exemplified herein as the HSS-IMS node.

The first core node 11 is exemplified herein as the UDM node.

The second core node 12 is exemplified herein as the AUSF node.

The second IMS node 16 exemplified herein as the IMS Core node or the S-CSCF node.

Step S1301. The UE 10 authenticates and registers in 5GC. The SUPI and credentials used by the UE 10 may not be based on IMSI/AKA. As part of the UE authentication in the 5GC of the SNPN, the UE 10 and the AUSF, e.g., the second core node 12, stores the Kausf, e.g., the first security key.

Step S1302. The UE establishes a PDU session for the DNN IMS and initiates IMS Registration. The IMPI and/or IMPU used by the UE 10 to register in IMS are based on the UE's SUPI used to register in 5GC. Note that the SUPI may contain a NAI used as an IMPI.

Step S1303. Upon receiving the SIP REGISTER the S-CSCF, e.g., second IMS node 16, uses a SIP Digest Authentication Vector (SD-AV) for authenticating the user. The S-CSCF sends a request for SD-AV(s) to the HSS, e.g., the first IMS node 15.

Step S1304. Upon receipt of a request from the S-CSCF, the HSS generates an authentication vector, e.g., an SD-AV, based on the Kausf generated during the primary authentication of the UE 10 in the 5GC of the SNPN. For that, the HSS sends a request to the UDM, e.g., the first core node 11, to retrieve a password from the AUSF, e.g., the second core node 12. This request can be realized based on the existing Nudm_UEAuthenticate_Get service operation with an additional indication for SIP Digest authentication. The request includes a SUPI generated from the IMPI.

Step S1305. The UDM selects the AUSF that stores the latest Kausf for the UE 10 and sends the request to the AUSF to generate the password, e.g., the SIP Digest password. A new generic Nausf_Password_Get service operation including an indication for SIP Digest as passwords based on Kausf may be used in other contexts. A specific Nausf_SIP-DigestPWD_Get service operation may be feasible too. The AUSF generates the password for SIP digest authentication for the UE and sends it to the UDM.

Step S1306. The UDM provides the password for SIP Digest generated by the AUSF to the HSS.

Step S1307. The HSS generates a SD-AV using the password received from the 5GC of the SNPN. The SD-AV is generated as specified in 3GPP TS 33.203.

Step S1308. The S-CSCF executes SIP-Digest authentication with the UE 10 and completes the IMS registration as currently specified.

As the password used to generate the SD-AV may be based on the Kausf and the Kausf is refreshed at each primary authentication of the UE in the 5GC of the SNPN, the SIP Digest mechanism proposed in some embodiments herein provides even better security as the traditional SIP Digest methods using static passwords stored in HSS.

Figure 14:
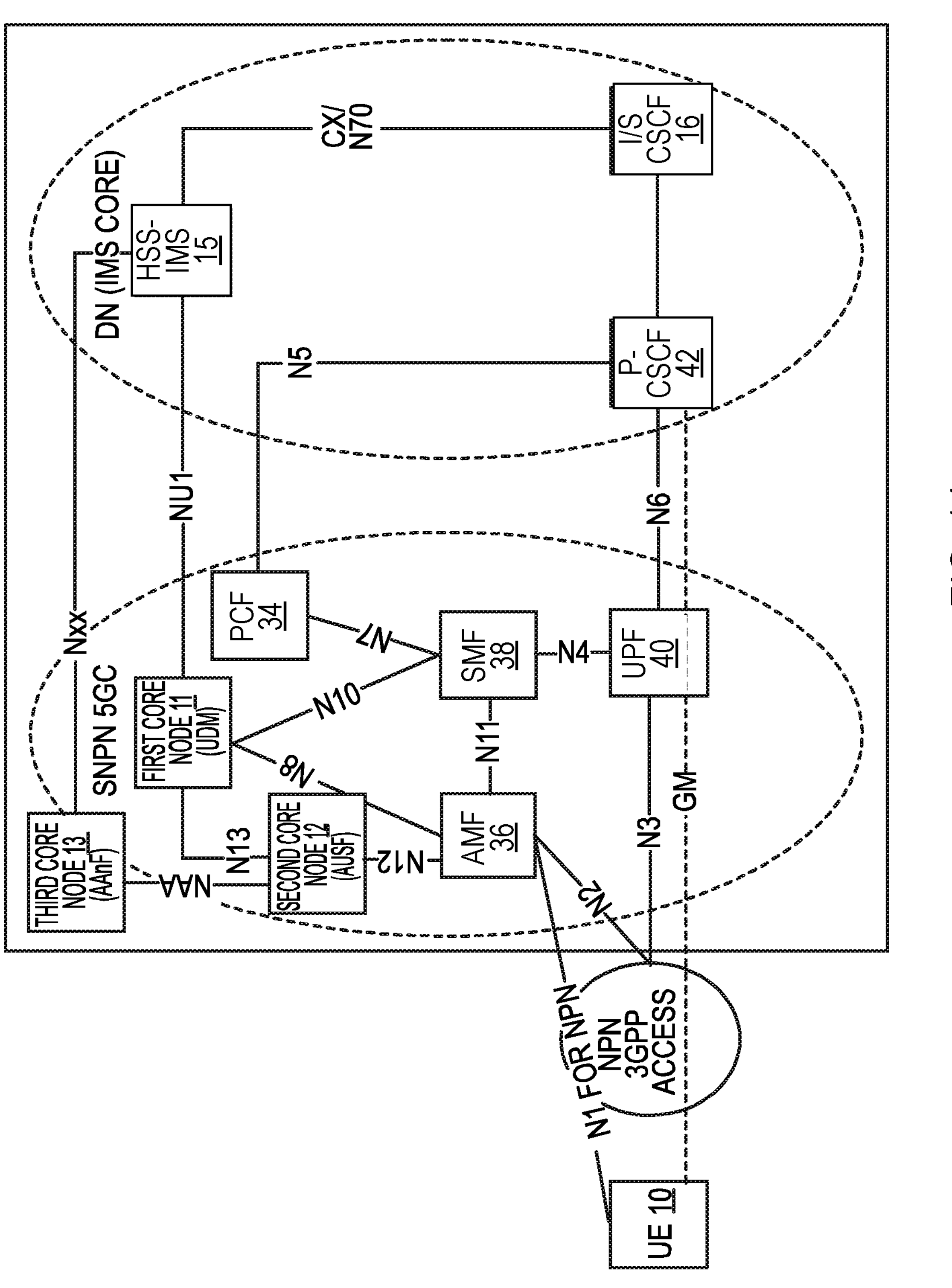
FIG. 14 is a schematic overview showing access to IMS services via SNPN using AKMA according to the principles of the present disclosure.

FIG. 14 shows the access to IMS services via SNPN using AKMA. More specifically, FIG. 14 depicts a reference architecture for an example process to enable access to the IMS domain to UEs which do not support AKA-based identifiers and credentials, e.g., when using 5GC access.

The first IMS node 15 is exemplified herein as the HSS-IMS node.

The first core node 11 is exemplified herein as the UDM node.

The second core node 12 is exemplified herein as the AUSF node.

The third core node 13 is exemplified herein as the AAnF node.

The second IMS node 16 exemplified herein as the IMS Core node.

The second core node 12, e.g., the AUSF, is also relevant as the interworking from the IMS of the PLMN with the AUSF in the 5GC of the SNPN is realized using the AKMA architecture instead, i.e., via the AAnF. The main principle in FIG. 14 is that the HSS in the PLMN acts as an AF in the AKMA architecture. In this case, it is considered that the HSS acts as a trusted AF for the SNPN, i.e., use of NEF is not required. Then the HSS generates a password for SIP digest based on the Kaf received from the AKMA architecture.

FIG. 15 depicts, according to some embodiments herein, the flow for the IMS authentication using SIP Digest passwords based on AKMA key material and comprises the following actions.

The first IMS node 15 is exemplified herein as the HSS-IMS node.

The second core node 12 is exemplified herein as the AUSF node.

The third core node 13 is exemplified herein as the AAnF node.

The second IMS node 16 exemplified herein as the IMS Core node.

Step S1501. The UE authenticates and registers in 5GC. The SUPI and credentials used by the UE 10 are not based on IMSI/AKA. As part of the UE authentication in the 5GC of the SNPN, the UE 10 and the AUSF, e.g., the second core node 12, stores a Kausf. Additionally, the UE 10 and the AUSF generate AKMA Key material (i.e., Kakma and A-KID), and the AUSF sends this material to the AAnF.

Step S1502. The UE 10 establishes a PDU session for the DNN IMS and initiates IMS Registration. The IMPI and/or IMPU used by the UE 10 to register in IMS are based on the UE SUPI used to register in 5GC. Note that the SUPI may contain a NAI used as an IMPI.

Figure 4:
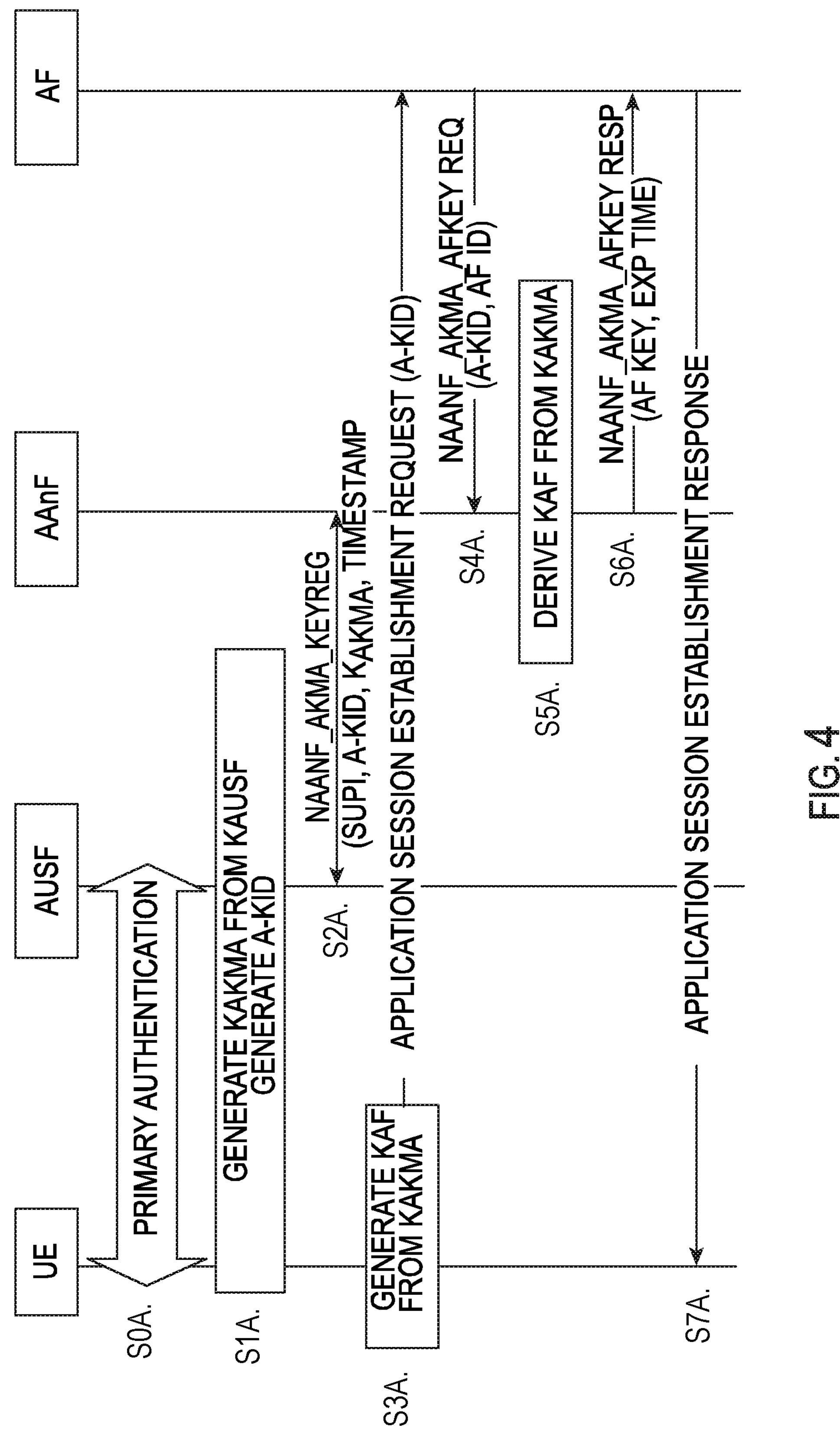
FIG. 4 is a schematic overview of another authentication mechanism in IMS.

According to some embodiments, the SIP Registration may correspond to the Application Session Establishment request in step S3A of FIG. 4. One key difference is that in this embodiment, there is no need for the UE 10 to include A-KID in the request as the UE 10 is already sufficiently identified with the IMPI/IMPU.

Step S1503. Upon receiving the SIP REGISTER the S-CSCF uses an authentication vector, e.g., a SIP Digest Authentication Vector (SD-AV), for authenticating the user. The S-CSCF sends a request for SD-AV(s) to the HSS.

Step S1504. Upon receipt of a request from the S-CSCF, the HSS generates an SD-AV based on the second security key, e.g., Kaf, retrieved from the AKMA infrastructure of the 5GC of the SNPN. For that, the HSS behaves as an AF in the AKMA architecture and sends a request to the AAnF to retrieve a Kaf. This request is realized using a Naanf_AKMA_AFKey service operation, e.g., as defined in 3GPP TS 33.535 except that the SUPI is used to refer to the UE instead of the A-KID (e.g., the SUPI is generated from the IMPI).

Step S1505. The AAnF generates a Kaf for the HSS using baseline AKMA procedures.

Step S1506. The AAnF provides the Kaf to the HSS using baseline AKMA procedures.

Step S1507. The HSS generates a SIP Digest password using the received Kaf. The password is then used in the generation of the SD-AV as specified in 3GPP TS 33.203.

Steps S1508-1509. The HSS provides the SD-AV to the S-CSCF which executes SIP-Digest authentication with the UE and completes the IMS registration as currently specified.

The second security key, e.g., Kaf, is also initially derived from the security key, e.g., Kausf, so in a way this embodiment also uses the Kausf as a base for the generation of the password for SIP digest authentication.

This makes a better reuse of the existing baseline procedures and interfaces. The Naanf_AKMA_AFKey service operation is updated to use the SUFI as reference for the UE instead of the A-KID. In the other hand, this implies an additional integration point between the HSS at the IMS of the PLMN and the AAnF at the 5GC of the SNPN.

Figure 16:
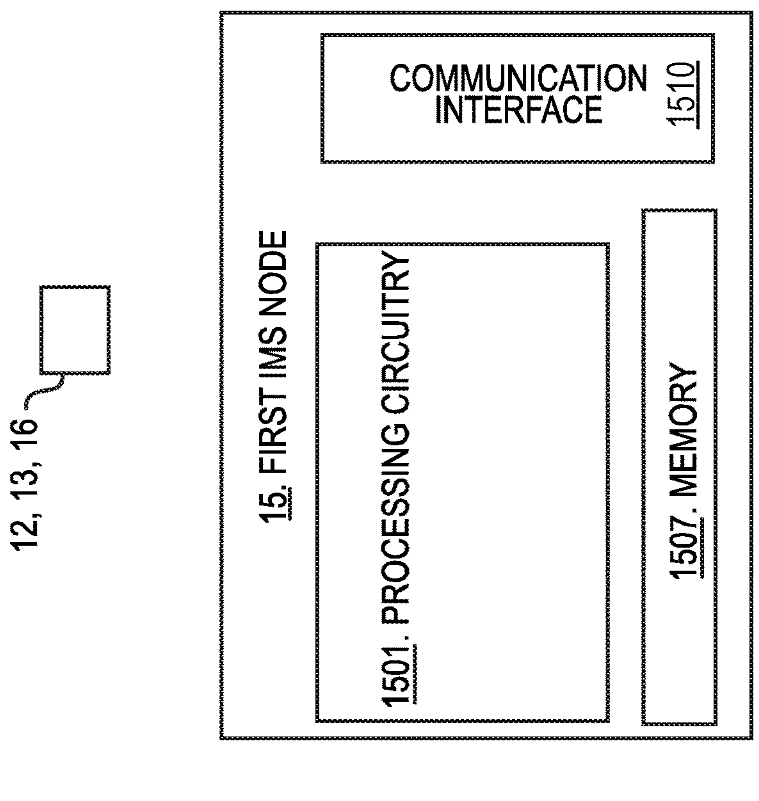
FIG. 16 is a schematic block diagram illustrating embodiments of a first IMS node according to the principles of the present disclosure.
Figure 16:
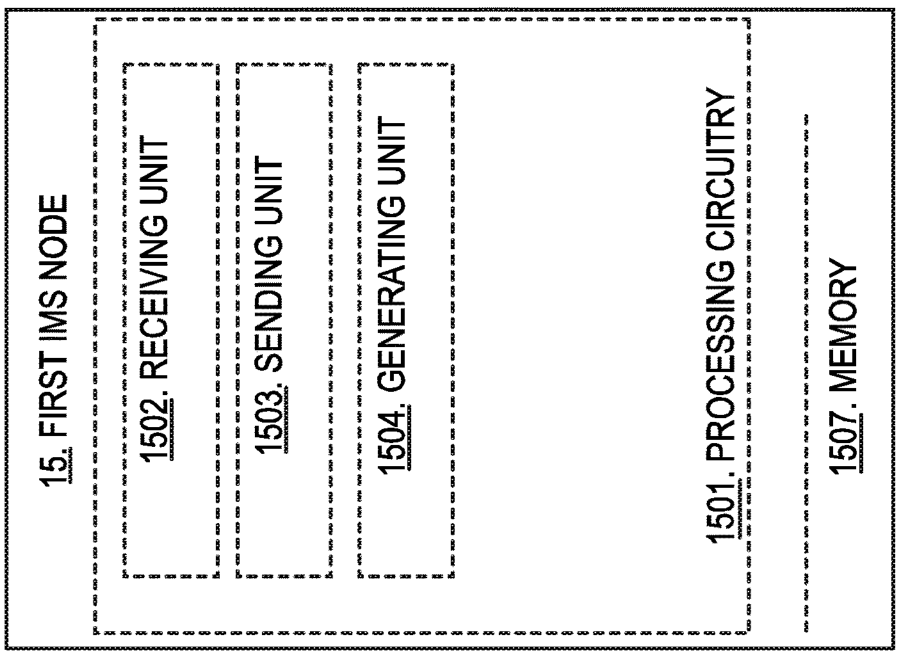

FIG. 16 is a block diagram depicting the first IMS node 15 for handling authentication of the UE 10 in a communication network, according to embodiments herein.

The first IMS node 15 may comprise processing circuitry 1501, e.g. one or more processors, configured to perform the methods herein.

The first IMS node 15 may comprise a receiving unit 1502. The first IMS node 15, the processing circuitry 1501, and/or the receiving unit 1502 is configured to receive a request from the second IMS node 16, to retrieve the authentication vector wherein the request is adapted to comprise the private identifier generated from the subscription permanent identifier.

The first IMS node 15, the processing circuitry 1501, and/or the receiving unit 1502 is configured to receive the indication. The indication may be the password or the second security key.

The first IMS node 15 may comprise a sending unit 1503. The first IMS node 15, the processing circuitry 1501, and/or the sending unit 1503 is configured to send the request to retrieve the indication, wherein the request is adapted to comprise the subscription permanent identifier generated from the private identifier. The request to retrieve the indication may be adapted to be sent to the first core node 11. The request to retrieve the indication may be adapted to be sent to the third core node 13.

The first IMS node 15, the processing circuitry 1501, and/or the sending unit 1503 is configured to send the generated authentication vector to the second IMS node 16 for authenticating the UE 10.

The first IMS node 15 may comprise a generating unit 1504. The first IMS node 15, the processing circuitry 1501, and/or the generating unit 1504 is configured to generate the authentication vector using the received indication.

The first IMS node 15 further comprises a memory 1507. The memory 1507 comprises one or more units to be used to store data on, such as indication information, private identifiers, public identifiers, authentication vectors, first security keys, second security keys, input/output data, metadata, etc. and applications to perform the methods disclosed herein when being executed, and similar. The first IMS node 15 may further comprise a communication interface 1510 comprising e.g. one or more antenna or antenna elements. Communication interface 1510 may be configured for setting up and maintaining at least a wireless/wireless connection with any other node, UE, or any other device.

The methods according to the embodiments described herein for the first IMS node 15 are respectively implemented by means of e.g. a computer program product 1508 or a computer program, comprising instructions, i.e., software code portions, which, when executed on at least one processor, cause the at least one processor to carry out the actions described herein, as performed by the first IMS node 15. The computer program product 1508 may be stored on a computer-readable storage medium 1509, e.g. a disc, a universal serial bus (USB) stick or similar. The computer-readable storage medium 1509 having stored thereon the computer program product, may comprise the instructions which, when executed on at least one processor, cause the at least one processor to carry out the actions described herein, as performed by the first IMS node 15. In some embodiments, the computer-readable storage medium may be a transitory or a non-transitory computer-readable storage medium.

Figure 17:
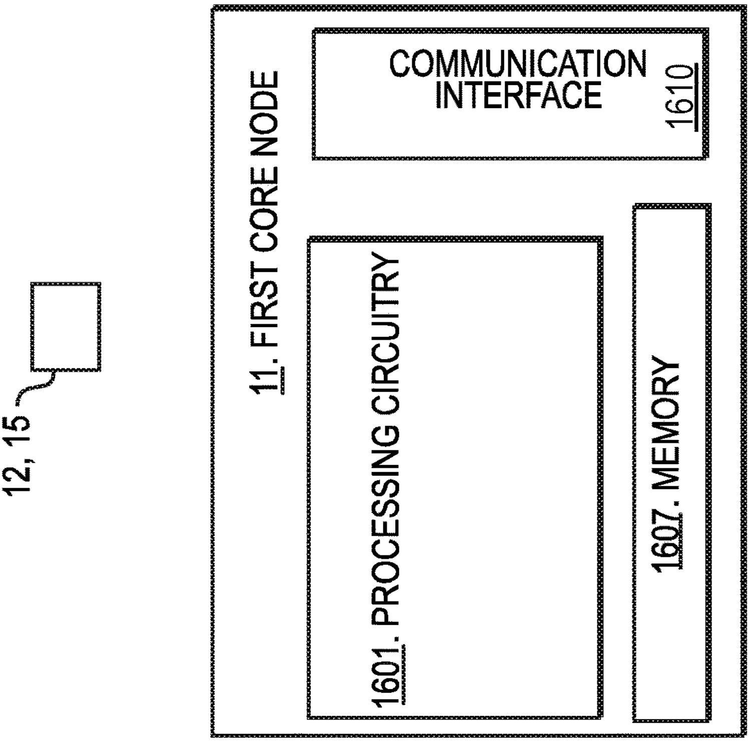
FIG. 17 is a schematic block diagram illustrating embodiments of a first access network node according to the principles of the present disclosure.
Figure 17:
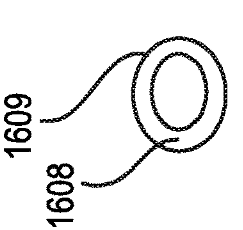

FIG. 17 is a block diagram depicting the first core node 11 for handling authentication of the UE 10 in a communication network, according to embodiments herein.

The first core node 11 may comprise processing circuitry 1601, e.g. one or more processors, configured to perform the methods herein.

The first core node 11 may comprise a receiving unit 1602. The first core node 11, the processing circuitry 1601, and/or the receiving unit 1602 is configured to receive the request from the first IMS node 15 to retrieve the indication, wherein the request is adapted to comprise the subscription permanent identifier generated from the private identifier. The indication may be the password.

The first core node 11, the processing circuitry 1601, and/or the receiving unit 1602 is configured to receive the indication from the second core node 12, wherein the indication is adapted to be based on the first security key, stored in the second core node 12.

The first core node 11 may comprise a selecting unit 1603. The first core node 11, the processing circuitry 1601, and/or the selecting unit 1603 is configured to select the second core node 12 that stores the first security key result of a latest authentication of the UE 10 in an access network.

The first core node 11 may comprise a sending unit 1604. The first core node 11, the processing circuitry 1601, and/or the sending unit 1604 is configured to send the indication request to the selected second core node 12.

The first core node 11 may comprise a providing unit 1605. The first core node 11, the processing circuitry 1601, and/or the providing unit 1605 is configured to provide the received indication to the first IMS node 15.

The first core node 11 further comprises a memory 1607. The memory 1607 comprises one or more units to be used to store data on, such as indication information, private identifiers, public identifiers, authentication vectors, first security keys, second security keys, input/output data, metadata, etc. and applications to perform the methods disclosed herein when being executed, and similar. The first core node 11 may further comprise a communication interface 1610 comprising e.g. one or more antenna or antenna elements. Communication interface 1610 may be configured for setting up and maintaining at least a wireless/wireless connection with any other node, UE, or any other device.

The methods according to the embodiments described herein for the first core node 11 are respectively implemented by means of e.g. a computer program product 1608 or a computer program, comprising instructions, i.e., software code portions, which, when executed on at least one processor, cause the at least one processor to carry out the actions described herein, as performed by the first core node 11. The computer program product 1608 may be stored on a computer-readable storage medium 1609, e.g. a disc, a universal serial bus (USB) stick or similar. The computer-readable storage medium 1609 having stored thereon the computer program product, may comprise the instructions which, when executed on at least one processor, cause the at least one processor to carry out the actions described herein, as performed by the first core node 11. In some embodiments, the computer-readable storage medium may be a transitory or a non-transitory computer-readable storage medium.

FIG. 18 is a block diagram depicting the second core node 12 for handling authentication of the UE 10 in a communication network, according to embodiments herein.

The second core node 12 may comprise processing circuitry 1701, e.g. one or more processors, configured to perform the methods herein.

The second core node 12 may comprise a receiving unit 1702. The second core node 12, the processing circuitry 1701, and/or the receiving unit 1702 is configured to receive the indication request from the first core node 11. The indication may be the password.

The second core node 12 may comprise a generating unit 1703. The second core node 12, the processing circuitry 1701, and/or the generating unit 1703 is configured to generate the indication based on the first security key result of the latest authentication of the UE in the access network.

The second core node 12 may comprise a sending unit 1704. The second core node 12, the processing circuitry 1701, and/or the sending unit 1704 is configured to send the generated indication to the first core node 11.

The second core node 12 may comprise a storing unit 1705. The second core node 12, the processing circuitry 1701, and/or the storing unit 1705 is configured to store the first security key generated from the primary authentication of the UE 10 in the access network.

The second core node 12 further comprises a memory 1707. The memory 1707 comprises one or more units to be used to store data on, such as indication information, private identifiers, public identifiers, authentication vectors, first security keys, second security keys, input/output data, metadata, etc. and applications to perform the methods disclosed herein when being executed, and similar. The second core node 12 may further comprise a communication interface 1710 comprising e.g. one or more antenna or antenna elements. Communication interface 1710 may be configured for setting up and maintaining at least a wireless/wirelesss connection with any other node, UE, or any other device.

The methods according to the embodiments described herein for the second core node 12 are respectively implemented by means of e.g. a computer program product 1708 or a computer program, comprising instructions, i.e., software code portions, which, when executed on at least one processor, cause the at least one processor to carry out the actions described herein, as performed by the second core node 12. The computer program product 1708 may be stored on a computer-readable storage medium 1709, e.g. a disc, a universal serial bus (USB) stick or similar. The computer-readable storage medium 1709, having stored thereon the computer program product, may comprise the instructions which, when executed on at least one processor, cause the at least one processor to carry out the actions described herein, as performed by the second core node 12. In some embodiments, the computer-readable storage medium may be a transitory or a non-transitory computer-readable storage medium.

Figure 19:
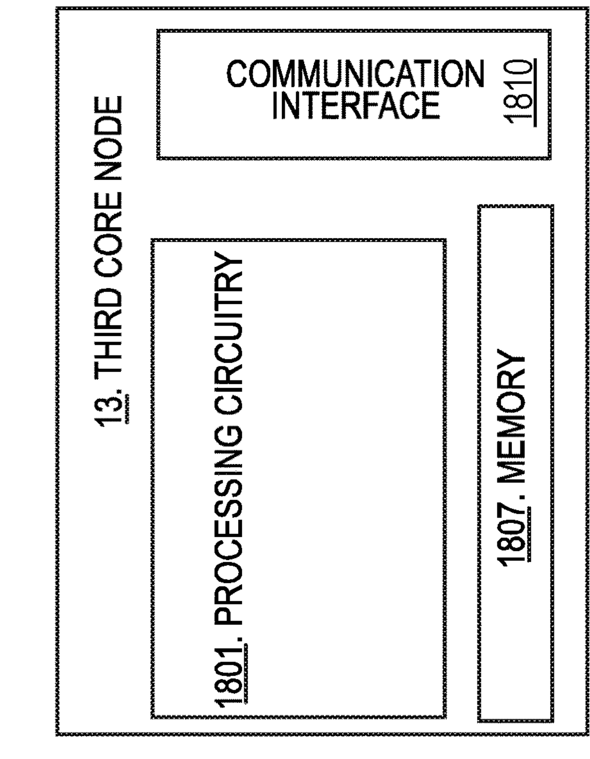
FIG. 19 is a schematic block diagram illustrating embodiments of a third access network node according to the principles of the present disclosure.

FIG. 19 is a block diagram depicting the third core node 13 for handling authentication of the UE 10 in a communication network, according to embodiments herein.

The third core node 13 may comprise processing circuitry 1801, e.g. one or more processors, configured to perform the methods herein.

The third core node 13 may comprise a receiving unit 1802. The third core node 13, the processing circuitry 1801, and/or the receiving unit 1802 is configured to receive the indication request from the first IMS node 15.

The third core node 13 may comprise a generating unit 1803. The third core node 13, the processing circuitry 1801, and/or the generating unit 1803 is configured to generate the indication based on the AKMA procedure. The indication may be the second security key.

The third core node 13 may comprise a sending unit 1804. The third core node 13, the processing circuitry 1801, and/or the sending unit 1804 is configured to send the generated indication to the first IMS node 15.

The third core node 13 further comprises a memory 1807. The memory 1807 comprises one or more units to be used to store data on, such as indication information, private identifiers, public identifiers, authentication vectors, first security keys, second security keys, input/output data, metadata, etc. and applications to perform the methods disclosed herein when being executed, and similar. The third core node 13 may further comprise a communication interface 1810 comprising e.g. one or more antenna or antenna elements. Communication interface 1810 may be configured for setting up and maintaining at least a wireless/wirelesss connection with any other node, UE, or any other device.

The methods according to the embodiments described herein for the third core node 13 are respectively implemented by means of e.g. a computer program product 1808 or a computer program, comprising instructions, i.e., software code portions, which, when executed on at least one processor, cause the at least one processor to carry out the actions described herein, as performed by the third core node 13. The computer program product 1808 may be stored on a computer-readable storage medium 1809, e.g. a disc, a universal serial bus (USB) stick or similar. The computer-readable storage medium 1809, having stored thereon the computer program product, may comprise the instructions which, when executed on at least one processor, cause the at least one processor to carry out the actions described herein, as performed by the third core node 13. In some embodiments, the computer-readable storage medium may be a transitory or a non-transitory computer-readable storage medium.

Figure 20:
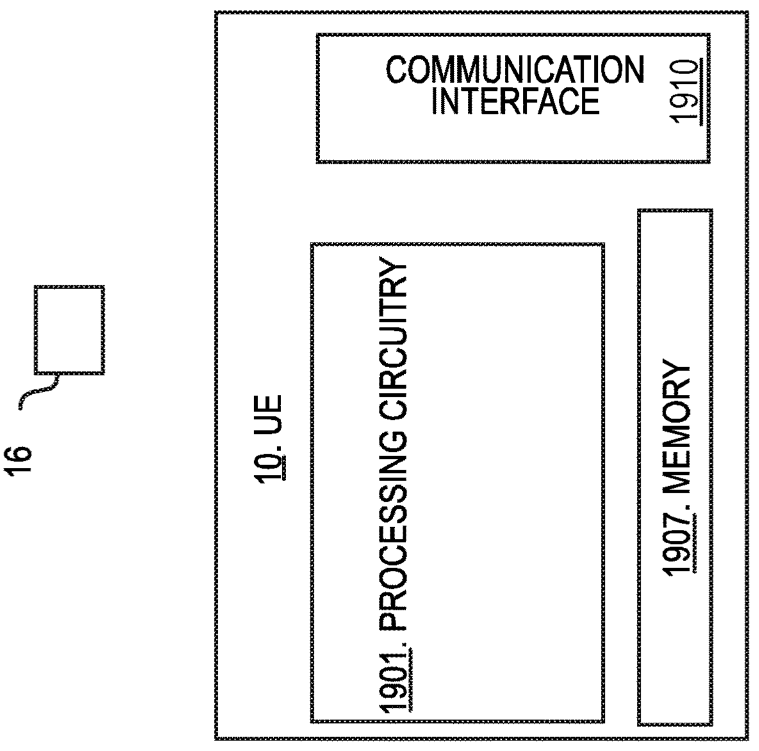
FIG. 20 is a schematic block diagram illustrating embodiments of a UE.

FIG. 20 is a block diagram depicting the UE 10 for handling authentication of the UE 10 in a communication network, according to embodiments herein.

The UE 10 may comprise processing circuitry 1901, e.g. one or more processors, configured to perform the methods herein.

The UE 10 may comprise a registering unit 1902. The UE 10, the processing circuitry 1901, and/or the registering unit 1902 may be configured to register to the access network by performing the primary authentication procedure.

The UE 10 may comprise a storing unit 1903. The UE 10, the processing circuitry 1901, and/or the storing unit 1903 may be configured to store the first security key generated from the primary authentication of the UE 10 in the access network.

The UE may comprise a deriving unit 1904. The UE 10, the processing circuitry 1901, and/or the deriving unit 1904 may be configured to derive the second security key from the first security key based on the AKMA procedure.

The UE 10 may comprise a generating unit 1905. The UE 10, the processing circuitry 1901, and/or the generating unit 1905 is configured to generate the password based on the stored first security key or the second security key which will be used for authenticating the UE 10 to the IMS.

The UE may comprise a sending unit 1906. The UE 10, the processing circuitry 1901, and/or the sending unit 1906 is configured to send the message, to the second IMS node 16 for registering the UE 10 to the IMS, based on the password generated during the primary authentication to the access network, wherein the message comprises the private identifier and the public identifier.

The UE 10 further comprises a memory 1907. The memory 1907 comprises one or more units to be used to store data on, such as indication information, private identifiers, public identifiers, authentication vectors, first security keys, second security keys, input/output data, metadata, etc. and applications to perform the methods disclosed herein when being executed, and similar. The UE 10 may further comprise a communication interface 1910 comprising e.g. one or more antenna or antenna elements. Communication interface 1910 may be configured for setting up and maintaining at least a wireless/wirelesss connection with any other node, UE, or any other device.

The methods according to the embodiments described herein for the UE 10 are respectively implemented by means of e.g. a computer program product 1908 or a computer program, comprising instructions, i.e., software code portions, which, when executed on at least one processor, cause the at least one processor to carry out the actions described herein, as performed by the UE 10. The computer program product 1908 may be stored on a computer-readable storage medium 1909, e.g. a disc, a universal serial bus (USB) stick or similar. The computer-readable storage medium 1909, having stored thereon the computer program product, may comprise the instructions which, when executed on at least one processor, cause the at least one processor to carry out the actions described herein, as performed by the UE 10. In some embodiments, the computer-readable storage medium may be a transitory or a non-transitory computer-readable storage medium.

In some embodiments a more general term "network node" is used and it can correspond to any type of radio-network node or any network node, which communicates with a wireless device and/or with another network node. Examples of network nodes are gNodeB, eNodeB, NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any radio access technology (RAT) or multi-RAT systems, where the devices receives and/or transmit signals, e.g. data, such as New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions, means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a UE or network node, for example.

Alternatively, several of the functional elements of the processing units discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

Further Extensions and Variations

Figure 21:
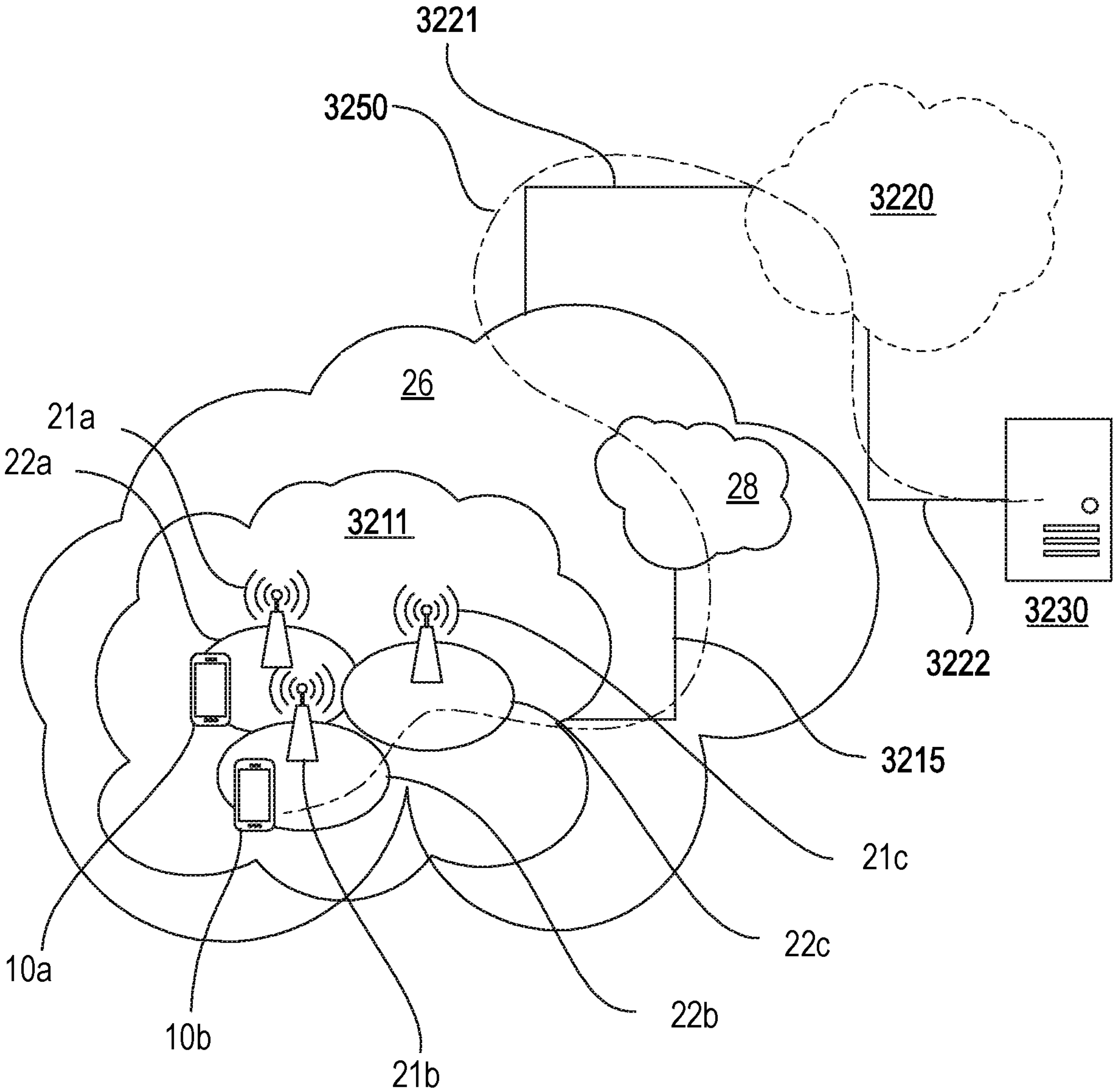
FIG. 21 schematically illustrates a telecommunication network connected via an intermediate network to a host computer according to the principles of the present disclosure.

With reference to FIG. 21, in accordance with an embodiment, a communication system includes a communications network 1, e.g. a wireless NR network, such as a 3GPP-type cellular network, which comprises an access network 26, such as a radio access network, and a core network 3214. The access network 26 comprises a plurality of radio network nodes 21*a*, 21*b*, 21*c* (collectively referred to as 21), e.g., base stations, AP STAs NBs, eNBs, gNBs or other types of wireless access points, each defining a corresponding coverage area 22, e.g., 22*a*, 22*b*, 22*c*. Each radio network node 21*a*, 21*b*, 21*c* is connectable to the core network 28 over a wired or wireless connection 32. A first UE 10*a* e.g. a wireless devices such as a Non-AP STA, located in coverage area 22*a* is configured to wirelessly connect to, or be paged by, the corresponding radio network node 21*a*. A second UE 10*b*, e.g. second radio node such as a Non-AP STA, in coverage area 22*b* is wirelessly connectable to the corresponding radio network node 21*b*, e.g., a base station. While a plurality of UEs 10*a* and 10*b* are illustrated in this example, the disclosed embodiments are equally applicable to a situation where a sole UE 10 is in the coverage area or where a sole UE 10 is connecting to the corresponding radio network node 21.

The access network 26 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the access network 26 and the host computer 3230 may extend directly from the core network 28 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication network of FIG. 21 as a whole enables connectivity between one of the connected UEs 10*a*, 10*b* and the host computer 3230. The connectivity may be described as an over-the-top (OTT) connection 3250. The host computer 3230 and the connected UEs 10*a*, 10*b* are configured to communicate data and/or signalling via the OTT connection 3250, using the access network 26, the core network 28, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a radio network node 21 may not or need not be informed about the past routing of an incoming downlink communication with data originating from a host computer 3230 to be forwarded (e.g., handed over) to a connected UE 10. Similarly, the radio network node 21 need not be aware of the future routing of an outgoing uplink communication originating from the UE 10*a* towards the host computer 3230.

Example implementations, in accordance with an embodiment, of the UE 10, radio network node 21, and host computer 3230 discussed in the preceding paragraphs will now be described with reference to FIG. 22. In a communication system 3300, a host computer 3230 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3230 further comprises software 3311, which is stored in or accessible by the host computer 3230 and executable by the processing circuitry 3318. The software 3311 includes a host application 3312. The host application 3312 may be operable to provide a service to a remote user, such as a UE 10 connecting via an OTT connection 3250 terminating at the UE 10 and the host computer 3230. In providing the service to the remote user, the host application 3312 may provide user data which is transmitted using the OTT connection 3250.

The communication system 3300 further includes a radio network node 21, e.g., a base station, provided in a telecommunication system and comprising hardware 3325 enabling it to communicate with the host computer 3230 and with the UE 10. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 10 located in a coverage area (not shown) served by the radio network node 21. The communication interface 3326 may be configured to facilitate a connection 3360 to the host computer 3230. The connection 3360 may be direct or it may pass through a core network 28 (not shown) of the telecommunication system and/or through one or more intermediate networks outside the telecommunication system. In the embodiment shown, the hardware 3325 of the radio network node 21 further includes processing circuitry 3328, which may comprise one or more programmable processors, application-specific integrated circuits, field programmable gate arrays or combinations of these (not shown) adapted to execute instructions. The radio network node 21 further has software 3321 stored internally or accessible via an external connection.

The communication system 3300 further includes the UE 10 already referred to. The UE 10 includes hardware 3335 which may include a radio interface 3337 configured to set up and maintain a wireless connection 3370 with a base station serving a coverage area in which the UE 10 is currently located. The hardware 3335 of the UE 10 further includes processing circuitry 1901, which may comprise one or more programmable processors, application-specific integrated circuits, field programmable gate arrays or combinations of these (not shown) adapted to execute instructions. The UE 10 further comprises software 3331, which is stored in or accessible by the UE 10 and executable by the processing circuitry 1901. The software 3331 includes a client application 3332. The client application 3332 may be operable to provide a service to a human or non-human user via the UE 10, with the support of the host computer 3230. In the host computer 3230, an executing host application 3312 may communicate with the executing client application 3332 via the OTT connection 3250 terminating at the UE 10 and the host computer 3310. In providing the service to the user, the client application 3332 may receive request data from the host application 3312 and provide user data in response to the request data. The OTT connection 3250 may transfer both the request data and the user data. The client application 3332 may interact with the user to generate the user data that it provides.

Figure 22:
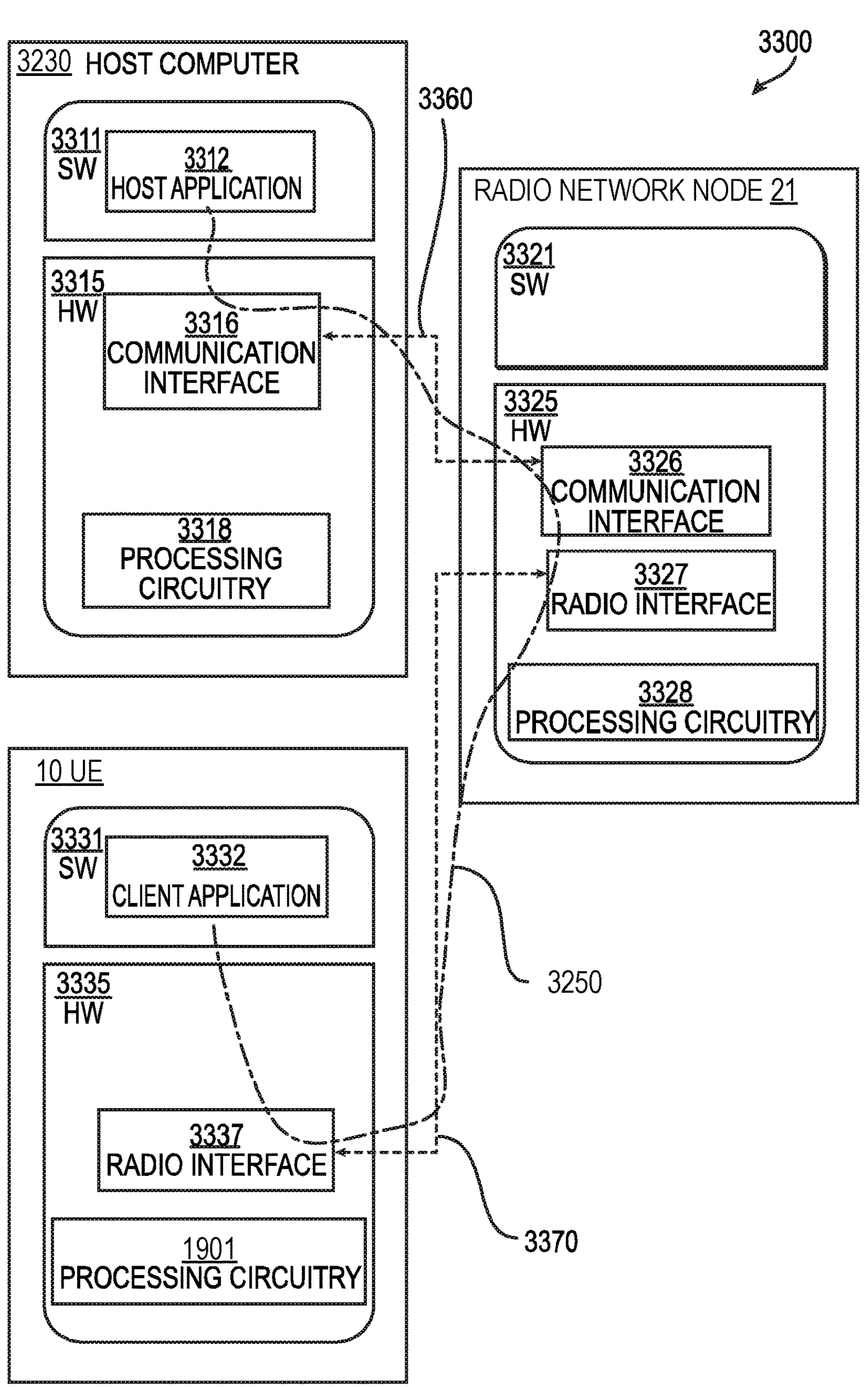
FIG. 22 is a generalized block diagram of a host computer communicating via a radio network node, e.g., a base station, with a user equipment over a partially wireless connection according to the principles of the present disclosure.

It is noted that the host computer 3230, radio network node 21, and UE 10 illustrated in FIG. 22 may be identical to the host computer 3230, one of radio network nodes 21*a*, 21*b*, 21*c* and one of the UEs 10*a*, 10*b* of FIG. 21, respectively. This is to say, the inner workings of these entities may be as shown in FIG. 22 and independently, the surrounding network topology may be that of FIG. 21.

In FIG. 22, the OTT connection 3250 has been drawn abstractly to illustrate the communication between the host computer 3230 and the use equipment 10 via the radio network node 21, without explicit reference to any intermediary devices and the precise routing of messages via these devices. Network infrastructure may determine the routing, which it may be configured to hide from the UE 10 or from the service provider operating the host computer 3230, or both. While the OTT connection 3250 is active, the network infrastructure may further take decisions by which it dynamically changes the routing (e.g., on the basis of load balancing consideration or reconfiguration of the network).

The wireless connection 3370 between the UE 10 and the radio network node 21 is in accordance with the teachings of the embodiments described throughout this disclosure. One or more of the various embodiments improve the performance of OTT services provided to the UE 10 using the OTT connection 3250, in which the wireless connection 3370 forms the last segment. More precisely, the teachings of these embodiments may improve the data rate, latency, and power consumption and thereby provide benefits such as user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3250 between the host computer 3230 and UE 10, in response to variations in the measurement results. The measurement procedure and/or the network functionality for reconfiguring the OTT connection 3250 may be implemented in the software 3311 of the host computer 3230 or in the software 3331 of the UE 10, or both. In embodiments, sensors (not shown) may be deployed in or in association with communication devices through which the OTT connection 3250 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3250 may include message format, retransmission settings, preferred routing etc.; the reconfiguring need not affect the radio network node 21, and it may be unknown or imperceptible to the radio network node 21. Such procedures and functionalities may be known and practiced in the art. In certain embodiments, measurements may involve proprietary UE signalling facilitating the host computer's 3230 measurements of throughput, propagation times, latency and the like. The measurements may be implemented in that the software 3311, 3331 causes messages to be transmitted, in particular empty or 'dummy' messages, using the OTT connection 3250 while it monitors propagation times, errors etc.

Figures 23, 24:
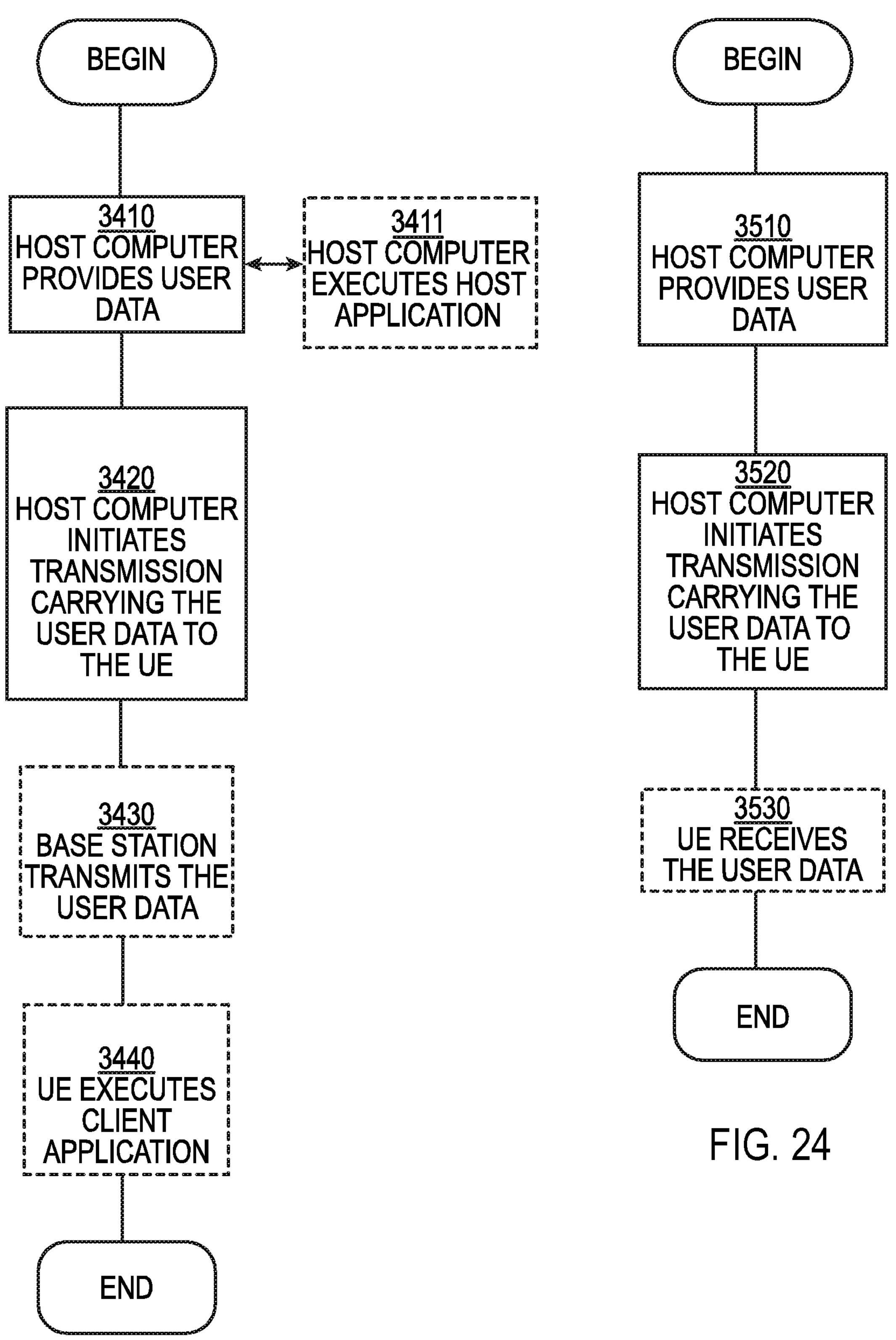
FIGS. 23 to 26 are flowcharts illustrating example methods implemented in a communication system including a host computer, a radio network node, e.g., a base station, and a user equipment according to the principles of the present disclosure.

FIG. 23 is a flowchart illustrating a method implemented in a communication system, in accordance with one embodiment. The communication system includes a host computer, a radio network node, e.g., a base station such as an AP STA, and a UE such as a Non-AP STA which may be those described with reference to FIGS. 21 and 22. For simplicity of the present disclosure, only drawing references to FIG. 23 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the radio network node, e.g., the base station, transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 24 is a flowchart illustrating a method implemented in a communication system, in accordance with one embodiment. The communication system includes a host computer, a radio network node, e.g., a base station such as an AP STA, and a UE such as a Non-AP STA which may be those described with reference to FIGS. 21 and 22. For simplicity of the present disclosure, only drawing references to FIG. 24 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the radio network node, e.g., the base station, in accordance with the teachings of the embodiments described throughout this disclosure. In an optional third action 3530, the UE receives the user data carried in the transmission.

Figures 25, 26:
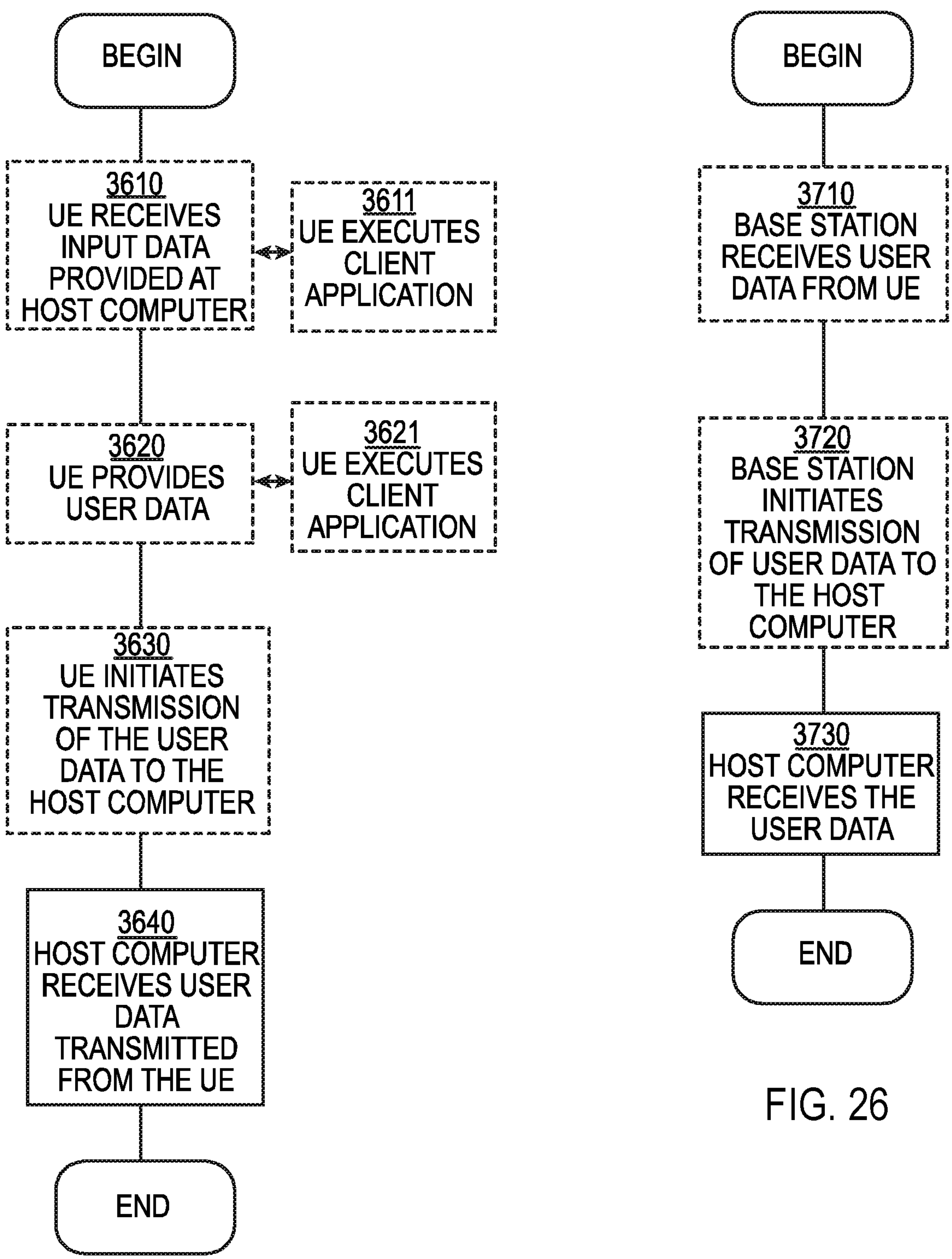

FIG. 25 is a flowchart illustrating a method implemented in a communication system, in accordance with one embodiment. The communication system includes a host computer, a radio network node, e.g., a base station such as an AP STA, and a UE such as a Non-AP STA which may be those described with reference to FIGS. 21 and 22. For simplicity of the present disclosure, only drawing references to FIG. 25 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 26 is a flowchart illustrating a method implemented in a communication system, in accordance with one embodiment. The communication system includes a host computer, a radio network node, e.g., a base station such as an AP STA, and a UE such as a Non-AP STA which may be those described with reference to FIGS. 21 and 22. For simplicity of the present disclosure, only drawing references to FIG. 26 will be included in this section. In an optional first action 3710 of the method, in accordance with the teachings of the embodiments described throughout this disclosure, the radio network node, e.g., the base station, receives user data from the UE. In an optional second action 3720, the radio network node, e.g., the base station, initiates transmission of the received user data to the host computer. In a third action 3730, the host computer receives the user data carried in the transmission initiated by the radio network node, e.g., the base station.

Additional embodiments are described as follows:

1. A method performed by a first IP multimedia system, IMS, node (15), e.g. HSS, for handling authentication of a user equipment, UE, (10) in a communication network, the method comprising:

receiving (S701) a request from a second IMS node (16), e.g. S-CSCF, to retrieve an authentication vector, wherein the request comprises a private identifier generated from a subscription permanent identifier;

sending (S702) a request to retrieve an indication, wherein the request comprises a subscription permanent identifier generated from a private identifier;

receiving (S703) the indication;

generating (S704) the authentication vector using the received indication; and sending (S705) the generated authentication vector to the second IMS node (16) for authenticating the UE.

2. The method according to Embodiment 1, wherein the request to retrieve the indication is sent to a first core node (11).

3. The method according to Embodiment 1, wherein the request to retrieve the indication is sent to a third core node (13).

4. The method according to any one of Embodiments 1-3, wherein the indication is a password or a second security key.

5. A method performed by a first core node (11), e.g. UDM, for handling authentication of a user equipment (10), UE, in a communication network, the method comprising:

receiving (S801) a request from a first IP multimedia system, IMS, node (15) to retrieve an indication, wherein the request comprises a subscription permanent identifier generated from the private identifier;

selecting (S802) a second core node (12), that stores a first security key result of a latest authentication of the UE in an access network;

sending (S803) an indication request to the selected second core node (12);

receiving (S804) the indication from the second core node (12), wherein the indication is based on a first security key, stored in the second core node (12); and providing (S805) the received indication to the first IMS node (15).

6. The method according to Embodiment 5, wherein the indication is a password.

7. A method performed by a second core node (12), e.g. AUSF, for handling authentication of a user equipment (10), UE, in a communication network, the method comprising:

receiving (S902) an indication request from a first core node (11);

generating (S903) an indication based on a first security key result of the latest authentication of the UE in an access network; and sending (S904) the generated indication to the first core node (11).

8. The method according to Embodiment 7, further comprises:

storing (S901) a first security key generated from a primary authentication of the UE in an access network;

9. The method according to any one of Embodiments 7 and 8, wherein the indication is a password.

10. A method performed by a third core node (13), e.g. AAnF, for handling authentication of a user equipment (10), UE, in a communication network, the method comprising:

receiving (S1001) an indication request from a first IMS node (15);

generating (S1002) the indication based on an Authentication and Key Agreement for Applications, AKMA, procedure; and sending (S1003) the generated indication to the first IMS node (15).

11. The method according to Embodiment 10, wherein the indication is a second security key.

12. A method performed by a User Equipment, UE, (10) for handling authentication of the UE in a communication network, the method comprising:

generating (S1104) a password based on a stored first security key or a second security key which will be used for authenticating the UE to an IP multimedia system, IMS; and sending (S1105) a message, to a second IMS node, e.g. S-CSCF, for registering the UE (10) to the IMS, based on the password generated during a primary authentication to an access network, wherein the message comprises a private identifier and a public identifier.

13. The method according to Embodiment 12, further comprises:

registering (S1101) to the access network by performing the primary authentication procedure;

storing (S1102) the first security key generated from the primary authentication of the UE in the access network; and deriving (S1103) the second security key from the first security key based on an Authentication and Key Agreement for Applications, AKMA, procedure.

14. A first IP multimedia system, IMS, node (15), e.g. HSS, for handling authentication of a user equipment, UE, (10) in a communication network, the first IMS node (15) being configured to:

receive a request from a second IMS node (16), e.g. S-CSCF, to retrieve an authentication vector wherein the request is adapted to comprise a private identifier generated from a subscription permanent identifier;

send a request to retrieve an indication, wherein the request is adapted to comprise a subscription permanent identifier generated from a private identifier;

receive the indication;

generate the authentication vector using the received indication; and send the generated authentication vector to the second IMS node (16) for authenticating the UE (10).

15. The first IMS node (15) according to Embodiment 14, wherein the request to retrieve the indication is adapted to be sent to a first core node (11).

16. The first IMS node (15) according to Embodiment 14, wherein the request to retrieve the indication is adapted to be sent to a third core node (13).

17. The first IMS node (15) according to any one of Embodiments 14-16, wherein the indication is a password or a second security key.

18. A first core node (11), e.g. UDM, for handling authentication of a user equipment (10), UE, in a communication network, the first core node (11) being configured to:

receive a request from a first IP multimedia system, IMS, node (15) to retrieve an indication, wherein the request is adapted to comprise a subscription permanent identifier generated from the private identifier;

select a second core node (12), e.g. AUSF, that stores a first security key result of a latest authentication of the UE in an access network;

send an indication request to the selected second core node (12);

receive the indication from the second core node (12), wherein the indication is adapted to be based on a first security key, stored in the second core node (12); and provide the received indication to the first IMS node (15).

19. The first core node (11) according to Embodiment 18, wherein the indication is a password.

20. A second core node (12), e.g. AUSF, for handling authentication of a user equipment (10), UE, in a communication network, the second core node (12) being configured to:

receive an indication request from a first core node (11);

generate an indication based on a first security key result of the latest authentication of the UE in an access network; and send the generated indication to the first core node (11).

21. The second core node (12) according to Embodiment 20, further being configured to:

store a first security key generated from a primary authentication of the UE in an access network.

22. The second core node (12) according to any one of Embodiments 20 and 21, wherein the indication is a password.

23. A third core node (13), e.g. AAnF, for handling authentication of a user equipment (10), UE, in a communication network, the third core node (13) being configured to:

receive an indication request from a first IMS node (15);

generate the indication based on an Authentication and Key Agreement for Applications, AKMA, procedure; and send the generated indication to the first IMS node (15).

24. The third core node (13) according to Embodiment 23, wherein the indication is a second security key.

25. A User Equipment, UE, (10) for handling authentication of the UE in a communication network, the UE (10) being configured to:

generate a password based on a stored first security key or a second security key which will be used for authenticating the UE to an IP multimedia system, IMS; and send a message, to a second IMS node, e.g. S-CSCF, for registering the UE (10) to the IMS, based on the password generated during a primary authentication to an access network, wherein the message comprises a private identifier and a public identifier.

26. The UE (10) according to Embodiment 25, further being configured to:

register to an access network by performing the primary authentication procedure;

store the first security key generated from the primary authentication of the UE in the access network; and derive the second security key from the first security key based on an Authentication and Key Agreement for Applications, AKMA, procedure.

27. A computer program product comprising instructions, which, when executed on at least one processor, cause the at least one processor to carry out the method according to any of the Embodiments 1-13, as performed by the first IMS node (15), first core node (11), second core node (12), third core node (13) and UE (10), respectively.

A computer-readable storage medium, having stored thereon a computer program product comprising instructions which, when executed on at least one processor, cause the at least one processor to carry out the method according to any of the Embodiments 1-13, as performed by the first IMS node (15), first core node (11), second core node (12), third core node (13) and UE (10), respectively.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method performed by a User Equipment, UE, for handling authentication of the UE in a communication network, the method comprising:
- generating a password based on any one of a stored first security key and a derived second security key, the password being used for authenticating the UE to a network node, and the first security key being a KAUSF security key; and
- sending a message, to a second IMS node for registering the UE to the network node based on the generated password, the message comprising a private identifier and a public identifier.

2. The method of claim 1, wherein the method further comprises:
- registering to an access network by performing a primary authentication procedure, the access network being part of the communication network; and
- storing the first security key generated from the primary authentication of the UE in the access network.

3. The method of claim 1, wherein the method further includes:
- deriving the second security key from the first security key based on an authentication procedure.

4. The method of claim 3, wherein the second security key is a KAF security key.

5. The method of claim 3, wherein the authentication procedure is an Authentication and Key Agreement for Applications, AKMA, procedure.

6. The method of claim 1, wherein the network node is an IP multimedia system, IMS, node, and the second IMS node is a Serving Call Session Control Function, S-CSCF.

7. The method of claim 1, wherein the password is a Session Internet Protocol Password, SIP, Digest password.

8. The method of claim 1, wherein the private identifier is an Internet Protocol Multimedia Subsystem, IMS, Private User Identity, IMPI, and the public identifier is an IMS Public User Identity, IMPU, the IMPI and the IMPU being generated based on a Subscription Permanent Identifier, SUPI.

9. A User Equipment, UE, for handling authentication of the UE in a communication network, the UE being configured to:
- generate a password based on any one of a stored first security key and a derived second security key, the password being used for authenticating the UE to a network node, and the first security key being a KAUSF security key; and
- send a message, to a second IMS node for registering the UE to the network node based on the generated password, the message comprising a private identifier and a public identifier.

10. The UE of claim 9, wherein the UE is further configured to:
- register to an access network by performing a primary authentication procedure, the access network being part of the communication network; and
- store the first security key generated from the primary authentication of the UE in the access network.

11. The UE of claim 9, wherein the UE is further configured to:
- derive the second security key from the first security key based on an authentication procedure.

12. The UE of claim 11, wherein the second security key is a KAF security key.

13. The UE of claim 11, wherein the authentication procedure is an Authentication and Key Agreement for Applications, AKMA, procedure.

14. The UE of claim 9, wherein the network node is an IP multimedia system, IMS, node, and the second IMS node is a Serving Call Session Control Function, S-CSCF.

15. The UE of claim 9, wherein the password is a Session Internet Protocol Password, SIP, Digest password.

16. The UE of claim 9, wherein the private identifier is an Internet Protocol Multimedia Subsystem, IMS, Private User Identity, IMPI, and the public identifier is an IMS Public User Identity, IMPU, the IMPI and the IMPU being generated based on a Subscription Permanent Identifier, SUPI.

* * * * *